(12) United States Patent  
Takita et al.

(10) Patent No.: US 8,032,028 B2
(45) Date of Patent: Oct. 4, 2011

(54) OPTICAL ADD/DROP DEVICE

(75) Inventors: Yutaka Takita, Kawasaki (JP); Yutaka Kai, Kawasaki (JP); Yasuhiko Aoki, Kawasaki (JP); Kyosuke Sone, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 11/681,463

(22) Filed: Mar. 2, 2007

(65) Prior Publication Data

US 2007/0147841 A1 Jun. 28, 2007

Related U.S. Application Data

(63) Continuation of application No. PCT/JP2004/013681, filed on Sep. 17, 2004.

(51) Int. Cl.
*H04J 14/02* (2006.01)

(52) U.S. Cl. ............................................. 398/83; 398/94

(58) Field of Classification Search .................... 398/83, 398/84, 85, 59, 58, 60, 66, 68, 69, 70, 71, 398/72, 79, 94, 101
See application file for complete search history.

(56) References Cited

U.S. PATENT DOCUMENTS

| 6,137,603 | A | 10/2000 | Henmi | |
|---|---|---|---|---|
| 6,525,852 | B1 * | 2/2003 | Egnell | 398/83 |
| 2002/0101636 | A1 * | 8/2002 | Xiao et al. | 359/127 |
| 2003/0156845 | A1 * | 8/2003 | Persson | 398/141 |

FOREIGN PATENT DOCUMENTS

| EP | 1349308 A2 | 10/2003 |
|---|---|---|
| JP | 4-291306 | 10/1992 |
| JP | 10-126350 A | 5/1998 |
| JP | 2001-100122 | 4/2001 |
| JP | 2001-148662 | 5/2001 |
| JP | 2003-318840 | 11/2003 |
| JP | 2004-15729 | 1/2004 |

OTHER PUBLICATIONS

"Japanese Office Action", in corresponding JP Pat. App. No. 2006-535007, mailed Sep. 29, 2009, Complete English Translation.
International Search Report mailed on Dec. 28, 2004 for International Application PCT/JP2004/013681.
"Japanese Office Action" mailed by JPO and corresponding to Japanese application No. 2006-535007 on Sep. 7, 2010, with English translation.

* cited by examiner

*Primary Examiner* — M. R. Sedighian
(74) *Attorney, Agent, or Firm* — Fujitsu Patent Center

(57) ABSTRACT

Optical add/drop nodes are used in a network having a pair of optical transmission paths for transmitting optical signals in opposite directions to each other. Each add/drop node comprises a variable split ratio optical coupler for splitting an optical signal output from a transmitter. The split ratio of the variable split ratio optical coupler is set such that the optical power levels of the signals added through the respective optical add/drop nodes are equal to one another respectively on the pair of optical transmission paths.

14 Claims, 31 Drawing Sheets

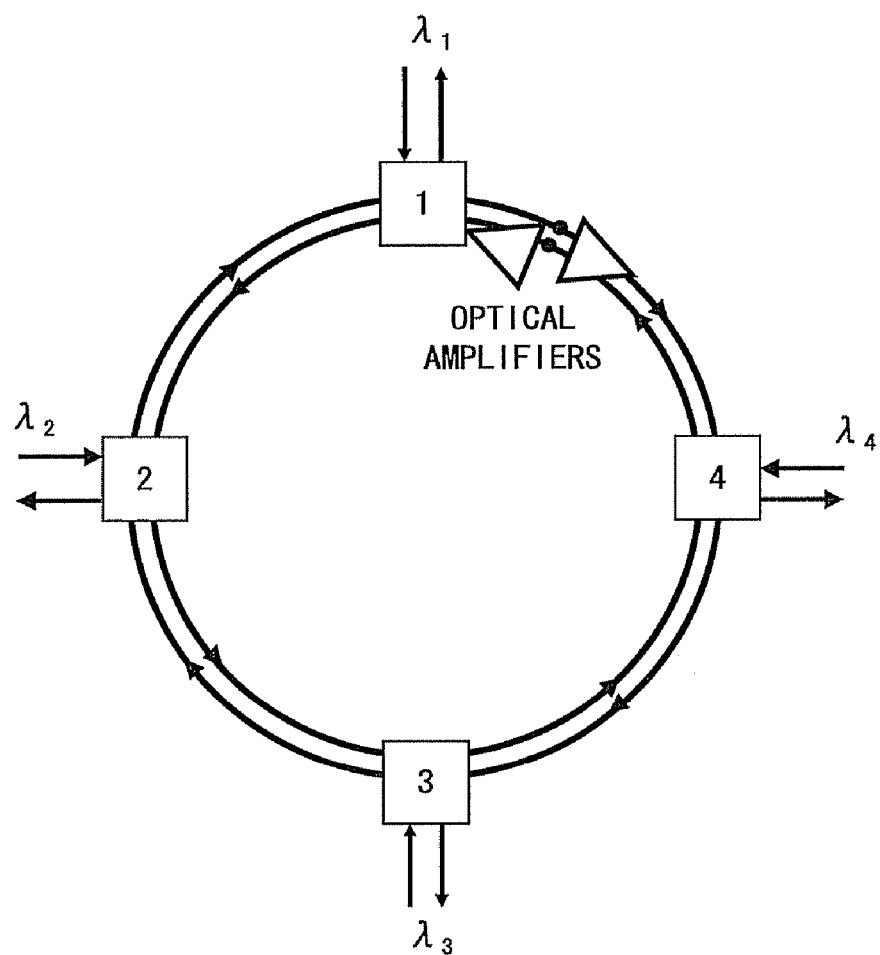
F I G. 5

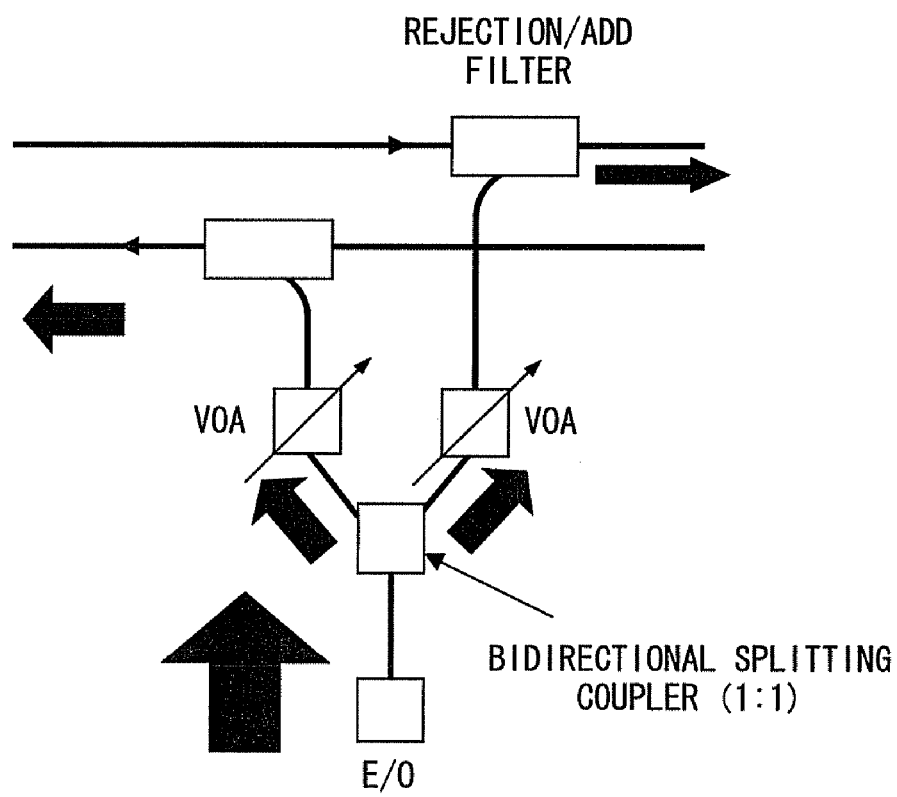
F I G. 6

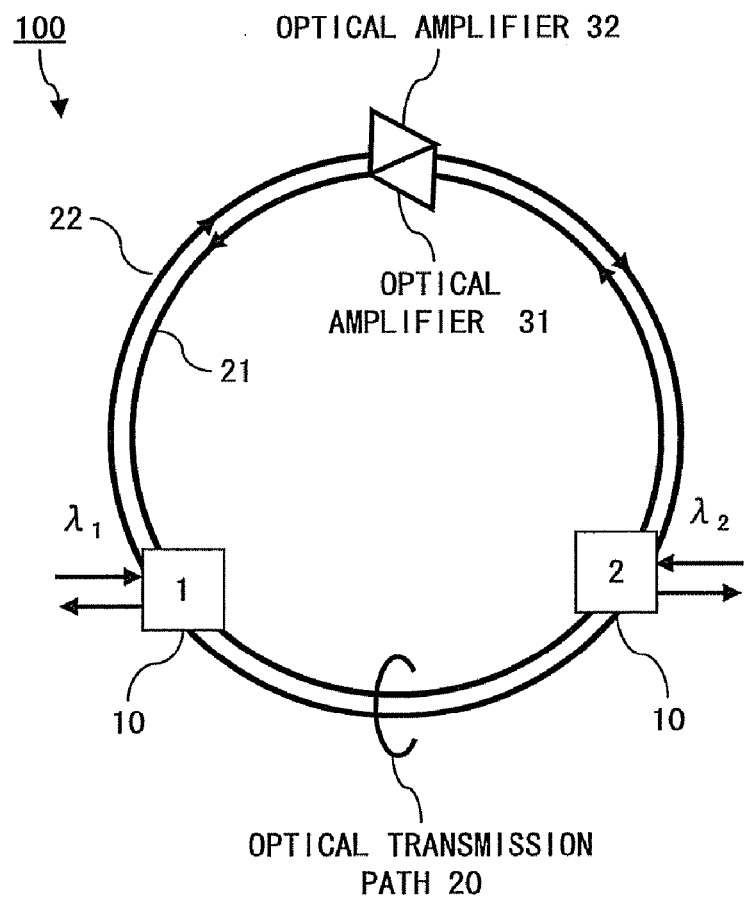
F I G. 7

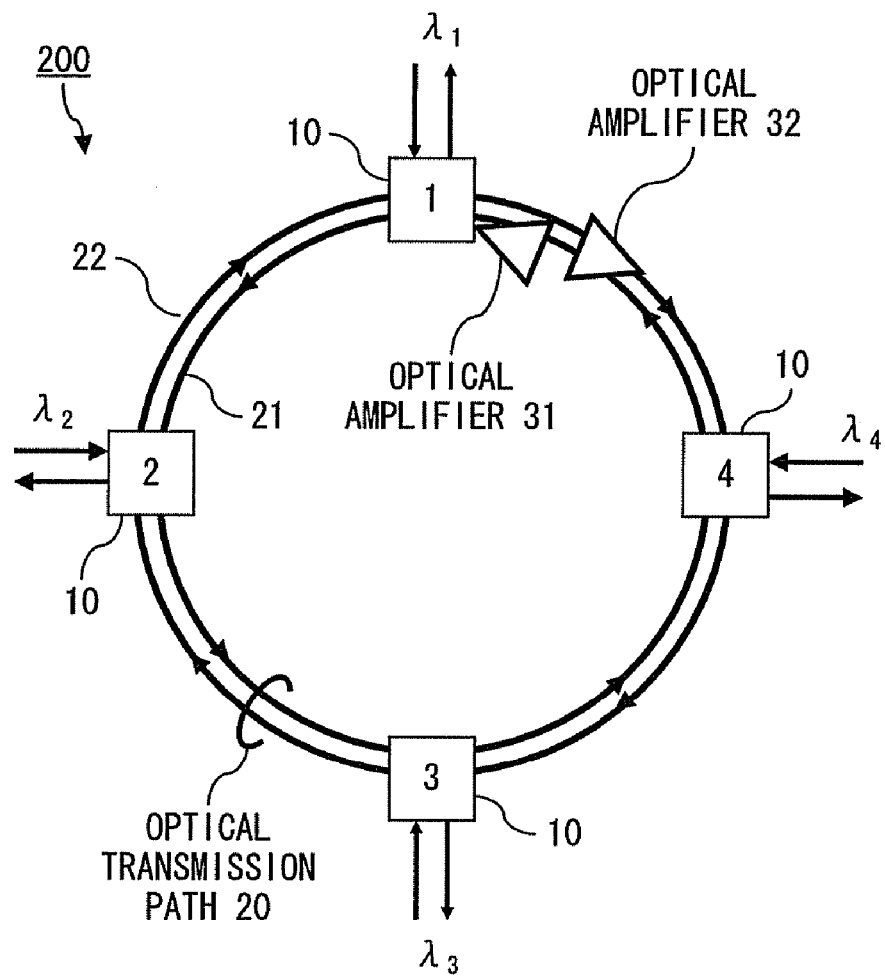
F I G. 13

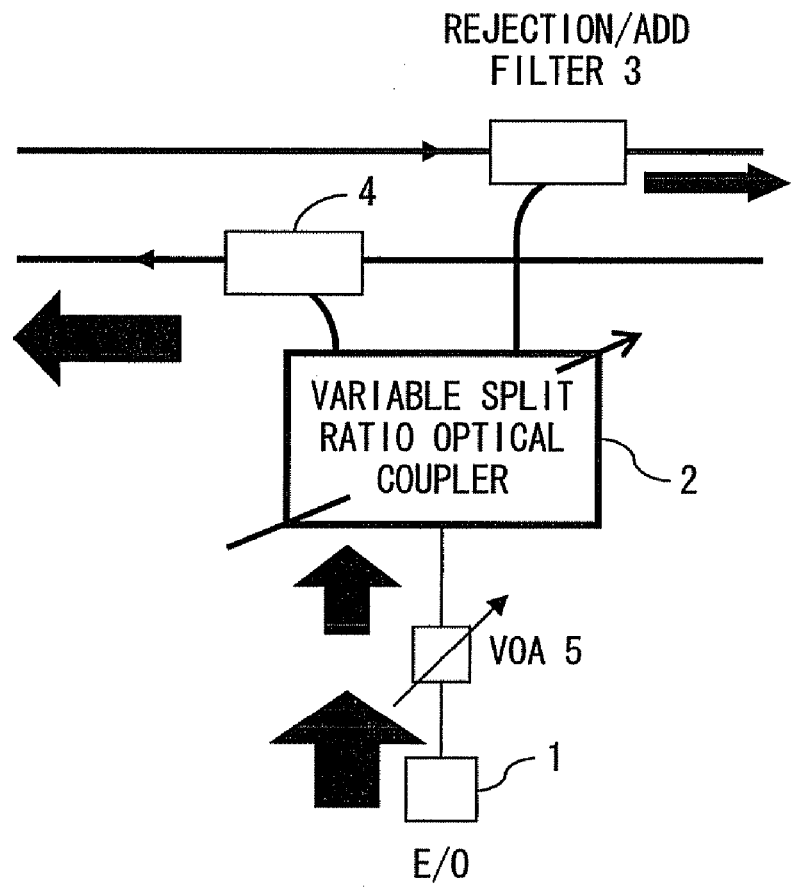
F I G. 15

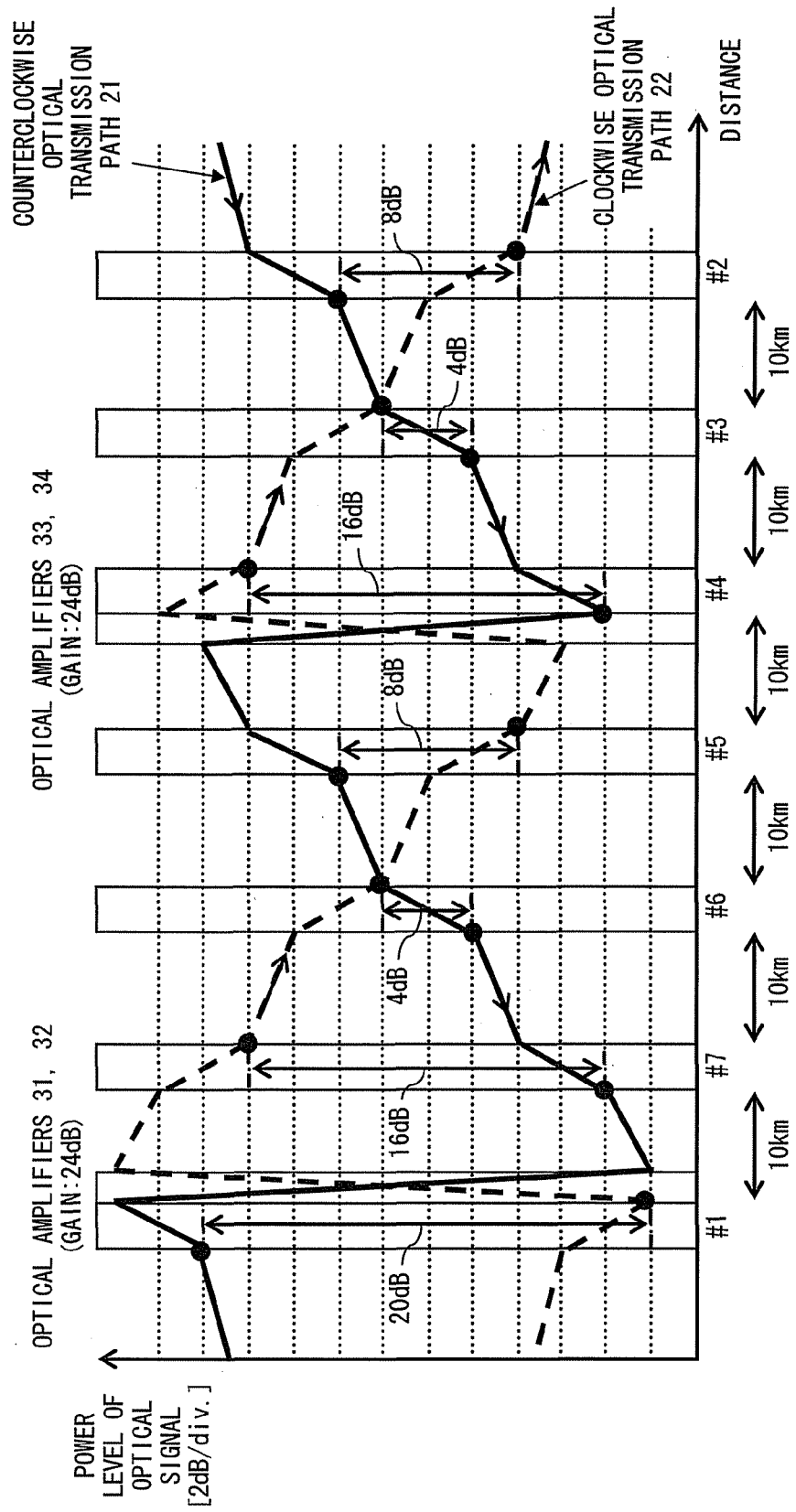
F I G. 21

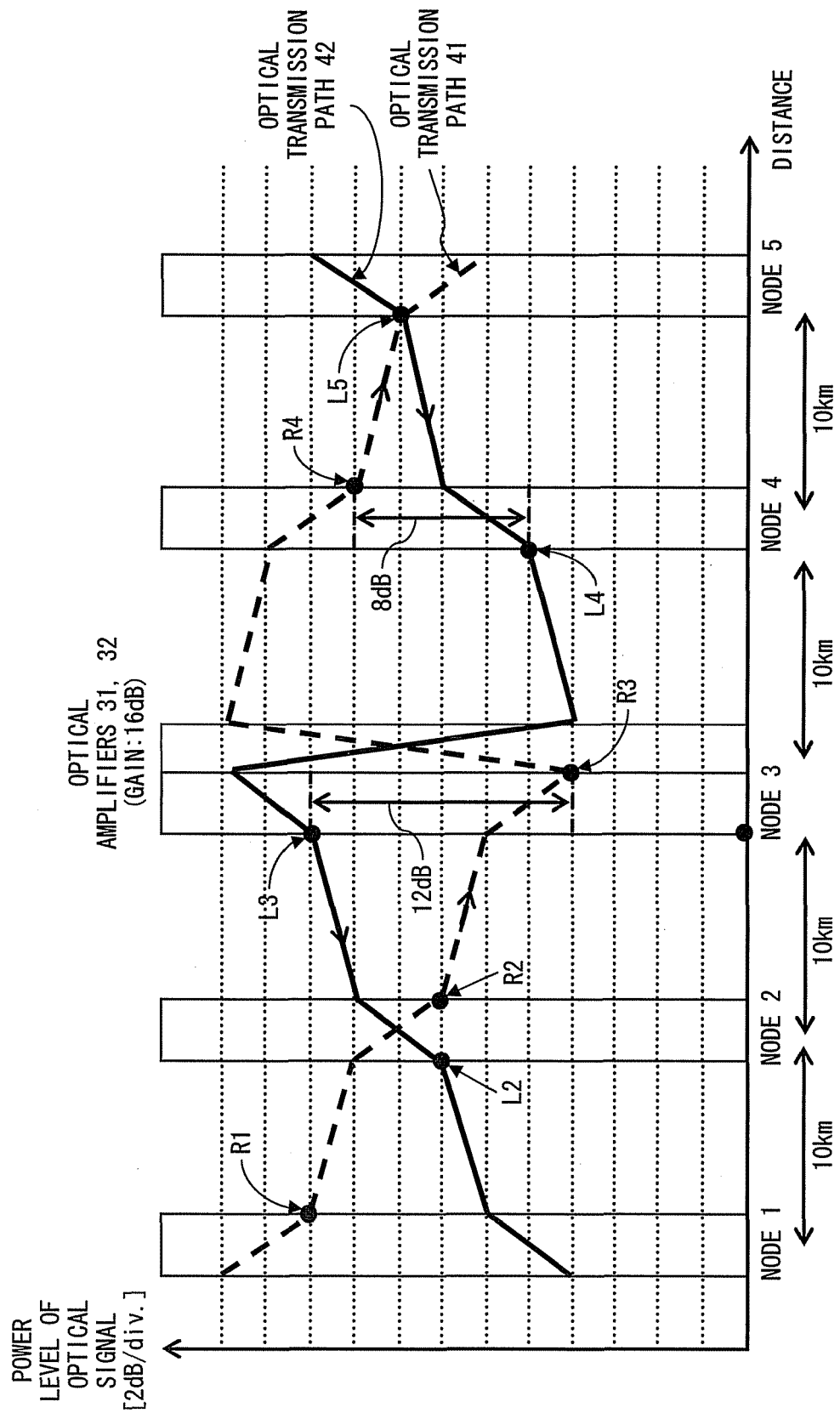
F I G. 2 3

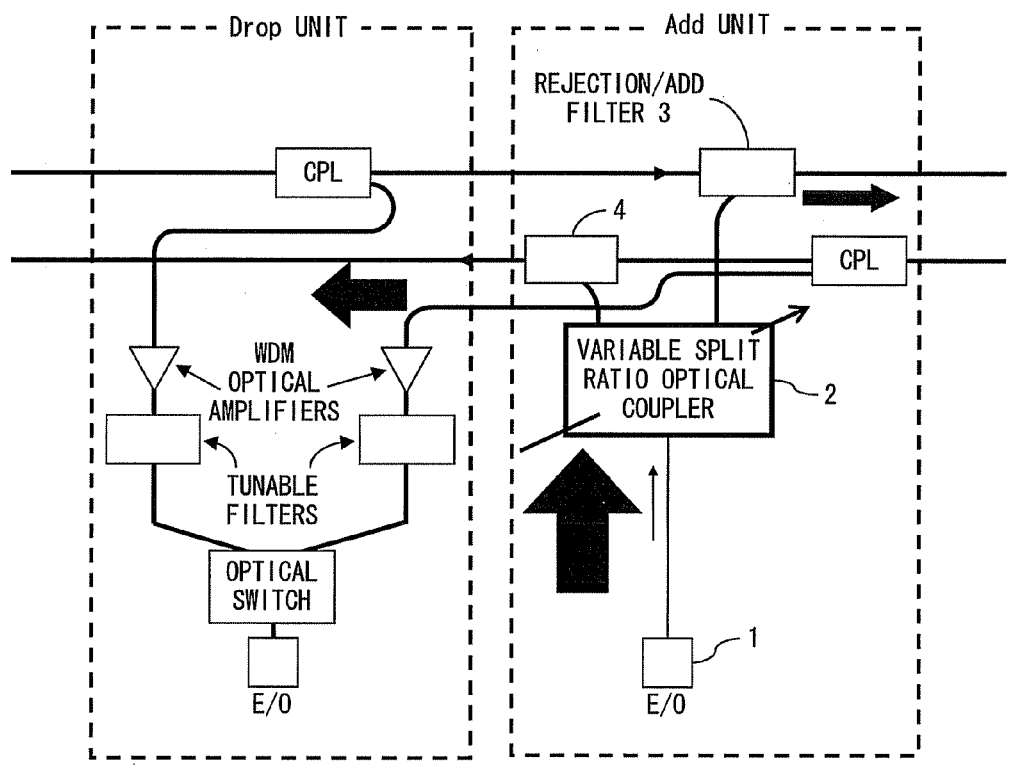
F I G. 2 4

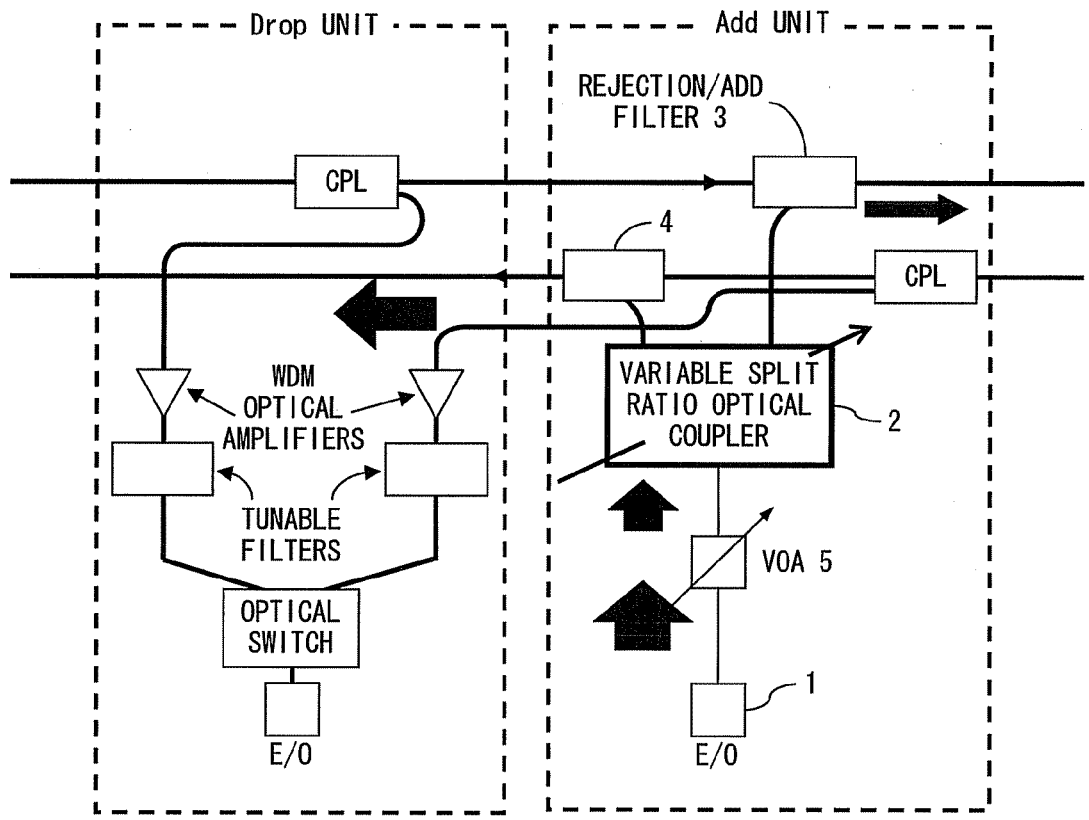
F I G. 2 5

OPTICAL ADD/DROP DEVICE

CROSS REFERENCE TO RELATED APPLICATION

This is a continuation of International Application PCT/JP2004/013681, which was filed on Sep. 17, 2004.

BACKGROUND OF THE RELATED ART

1. Field of the Invention

The present invention relates to an optical network system in which each transmission path consists of a pair of optical fibers for transmitting signals in opposite directions to each other, and to an optical add/drop device used in such an optical network system.

2. Description of the Related Art

Conventionally, optical network systems have been developed to be mainly used for long-distance transmission. The optical network systems are designed in such a way that the distance between optical nodes provided on each transmission path is generally, for example, 100 km. Accordingly, as shown in FIG. 1, optical amplifiers are provided between respective optical nodes (or at the respective optical nodes) for amplifying optical signal in such optical network systems.

The optical network system shown in FIG. 1 is a WDM (Wavelength Division Multiplex) system in which signals at a plurality of wavelengths (λ1 through λ4) are multiplexed and transmitted and in which four optical nodes and four WDM optical amplifiers are provided on the transmission path. In this configuration, each optical node adds and drops, to and from the main transmission path, the light with the wavelength corresponding to the optical node.

In recent years, optical networks have also been realized for use in urban areas with relatively short transmission distances. These networks are often called optical metro access networks, and the distance between optical nodes is generally 10 km. This means that the transmission loss between optical nodes in these networks is relatively small. Accordingly, the optical metro access network can be configured so that one optical amplifier is provided for a plurality of optical nodes, as shown in FIG. 2, in order to reduce costs. In the example shown in FIG. 2, one WDM optical amplifier is provided for the four optical nodes.

However, if the optical signals are added to the main transmission path through optical nodes with the same optical power, the power will be different among the respective wavelengths in the multiplexed WDM light. Here, optical levels at the input port of the optical amplifier used in a ring optical network system including four optical nodes and an optical amplifier provided between optical node (#1) and optical node (#4) are discussed. The optical signals are transmitted in the counterclockwise direction in the above configuration in FIG. 3.

In this case, the distances between the respective optical nodes and the optical amplifiers are different from each other. Thus, in the example in FIG. 3, when the optical signals with equal power are added to the main transmission path through the respective optical nodes, the optical power level of the signal added through optical node (#1) is the minimum while the optical power level of the signal added through optical node (#4) is the maximum at the input port of the optical amplifier. In other words, the levels of the respective optical signals are very different from one another. This causes the problems listed below.

(1) The dynamic range of the receiver has to be broadened.

(2) Crosstalk is caused when dropping signals in the respective optical nodes.

(3) Signals deteriorate due to gain saturation in the WDM optical amplifier.

Patent Document 1 (Japanese Patent Application Publication No. 2004-15729 (FIGS. 2 and 3, paragraphs 0037 through 0041, and Abstract)) discloses a technique for solving these problems. Japanese Patent Application Publication No. 2004-15729 (FIGS. 2 and 3, paragraphs 0037 through 0041, and Abstract) In the optical network system described in Patent Document 1, variable optical attenuators (VOA) are provided at the respective optical nodes for adjusting the optical power of each of the added signals, as shown in FIG. 4. The variable optical attenuators provided at the respective optical nodes are respectively adjusted such that the levels of the signals are equal to one another at the input port of the optical amplifier provided on the transmission path. As a result, all of the wavelengths of the WDM light including the signals added through the optical nodes have a generally equal power.

An O-UPSR (Optical Unidirectional Path Switched Ring) is known to be one of several configurations that improves the reliability of optical networks. In the O-UPSR, duplex optical transmission paths are used; in these paths, a pair of optical fibers transmits the same data in opposite directions.

However, the technique of making the optical power levels of the signals added through respective optical nodes equal to one another on the transmission path in a system that transmits signals in opposite directions through a pair of optical fibers is not known. Accordingly, in this case it is assumed that each optical node used in such a system has a configuration shown in FIG. 6.

In the optical node shown in FIG. 6, optical signal output from the transmitter (E/O) is split by a bidirectional splitting coupler. The split ratio is 1:1. The output of the bidirectional splitting coupler is a pair of signals that are added to the transmission path in the clockwise direction and the counterclockwise direction, and the optical power of each of the signals is adjusted by the variable optical attenuators (VOA). The adjustment by the variable optical attenuators for the transmission paths in the clockwise direction and in the counterclockwise direction is performed on the basis of the method described in Patent Document 1, being explained with reference to FIG. 4.

Via the above configuration, it is essentially possible to make the optical power levels of the respective wavelengths in the WDM light including signals added through the optical nodes equal to one another on the transmission paths, respectively in the clockwise direction and in the counterclockwise direction. However, in this configuration, the optical power of each of the signals added through the respective optical nodes is decreased. This causes the problems listed below.

(1) Transmission distance is shortened.

(2) The number of WDM optical amplifiers has to be increased.

(3) The number of optical nodes that can be provided on the network is decreased.

As described above, the technique of making the optical power of the respective wavelengths in the WDM light including signals added through optical nodes equal to one another in optical network systems using a pair of transmission paths that transmit signals in opposite directions has not been conventionally established. Also, when the optical power levels at the respective wavelengths in the WDM light are made to be equal to one another by combining the prior art configuration, the optical power of the signals is decreased.

SUMMARY OF THE INVENTION

It is an object of the present invention to suppress, in an optical network system having a pair of optical transmission paths for transmitting signals in opposite directions, a decrease in the optical power of the signals added through respective optical add/drop nodes while making the optical power of each signal equal to the others on the transmission paths.

An optical add/drop device according to the present invention is used in an optical network having a first optical transmission path and a second optical transmission path for transmitting signals in opposite directions to each other, and comprises: a variable split ratio optical coupler for splitting an optical signal to generate a first split signal and a second split signal; and an optical device for adding the first split signal to the first optical transmission path and for adding the second split signal to the second optical transmission path.

According to this invention, it is possible to obtain optical power that is required on the first optical transmission path and the second optical transmission path by appropriately adjusting the split ratio of the variable split ratio optical coupler. In addition, with this configuration, losses are reduced in comparison to the configuration in which the optical power of respective split signals is adjusted after splitting an input optical signal at a ratio of 1:1.

An optical add/drop device according to another aspect of the present invention is used in an optical network having a first optical transmission path and a second optical transmission path for transmitting signals in the opposite directions to each other, and comprises: an optical splitter for splitting an input optical signal to generate a first split signal and a second split signal; and an optical add unit for adding the first split signal to the first optical transmission path and for adding the second split signal to the second optical transmission path. The optical splitter splits the input optical signal at a split ratio such that the optical power of a signal added to the first optical transmission path through another optical add/drop device and the optical power of the first split signal are equal to or approximately equal to each other on the first optical transmission path, and such that the optical power of a signal added to the second optical transmission path through another optical add/drop device and the optical power of the second split signal are equal to or approximately equal to each other on the second optical transmission path.

According to this invention, the losses of optical power are reduced similarly to the above invention. Further, it is possible to make the optical power of each of the signals added through the respective add/drop devices equal to one another on the transmission path by adjusting the split ratio of the variable split ratio coupler.

An optical add/drop device according to still another aspect of the present invention is used in an optical network having a first optical transmission path and a second optical transmission path for transmitting signals in opposite directions to each other, and comprises: an adjustment unit for adjusting the optical power of an input optical signal; an optical splitter for splitting a signal with optical power adjusted by the adjustment unit to generate a first split signal and a second split signal; and an optical add unit for adding the first split signal to the first optical transmission path and for adding the second split signal to the second optical transmission path. In addition, the amount of optical power adjusted by the adjustment unit and the split ratio of the optical splitter are determined such that the optical power of each the signal added through the optical add unit is equal to or approximately equal to the optical power of a signal added through another optical add/drop device respectively on the first optical transmission path and the second optical transmission path. According to this invention, the losses of optical power are reduced similarly to the above inventions.

When it is difficult or impossible to make the optical power levels of each of the signals added through the respective add/drop devices equal to one another on the transmission path only by adjusting the split ratio of the variable split ratio coupler, the optical power of a signal may be adjusted before being input into the variable split ratio optical coupler. In this case, the adjustment unit may adjust the optical power of the input optical signal such that, for example, the optical power of a signal guided to the optical splitter is equal to or approximately equal to the total power of a pair of optical signals, added by another optical add/drop device and transmitted respectively via the first and second transmission pats, at this optical add/drop device.

According to the present invention, it is possible to suppress a decrease in the optical power of signals added through respective optical add/drop nodes while making the optical power of each signal equal to each of the others on a transmission path in an optical network system having a pair of optical transmission paths for transmitting signals in the opposite directions to each other.

BRIEF DESCRIPTION OF DRAWINGS

FIG. 5 shows a configuration of a two-fiber network;

FIG. 6 shows an example of an optical add/drop node that is required to be provided in two-fiber networks;

FIG. 7 shows a configuration of an optical network system according to an embodiment of the present invention;

FIG. 13 shows a configuration of an optical network system according to another embodiment;

FIG. 15 shows the second example of an add unit in an optical add/drop node;

FIG. 21 is a diagram showing the power levels of optical signals in the optical network system shown in FIG. 20;

FIG. 23 is a diagram showing the power levels of optical signals in the optical network system shown in FIG. 22;

FIG. 24 shows the first configuration of an optical add/drop node;

FIG. 25 shows the second configuration of an optical add/drop node;

DESCRIPTION OF THE PREFERRED EMBODIMENTS

Figure 1:
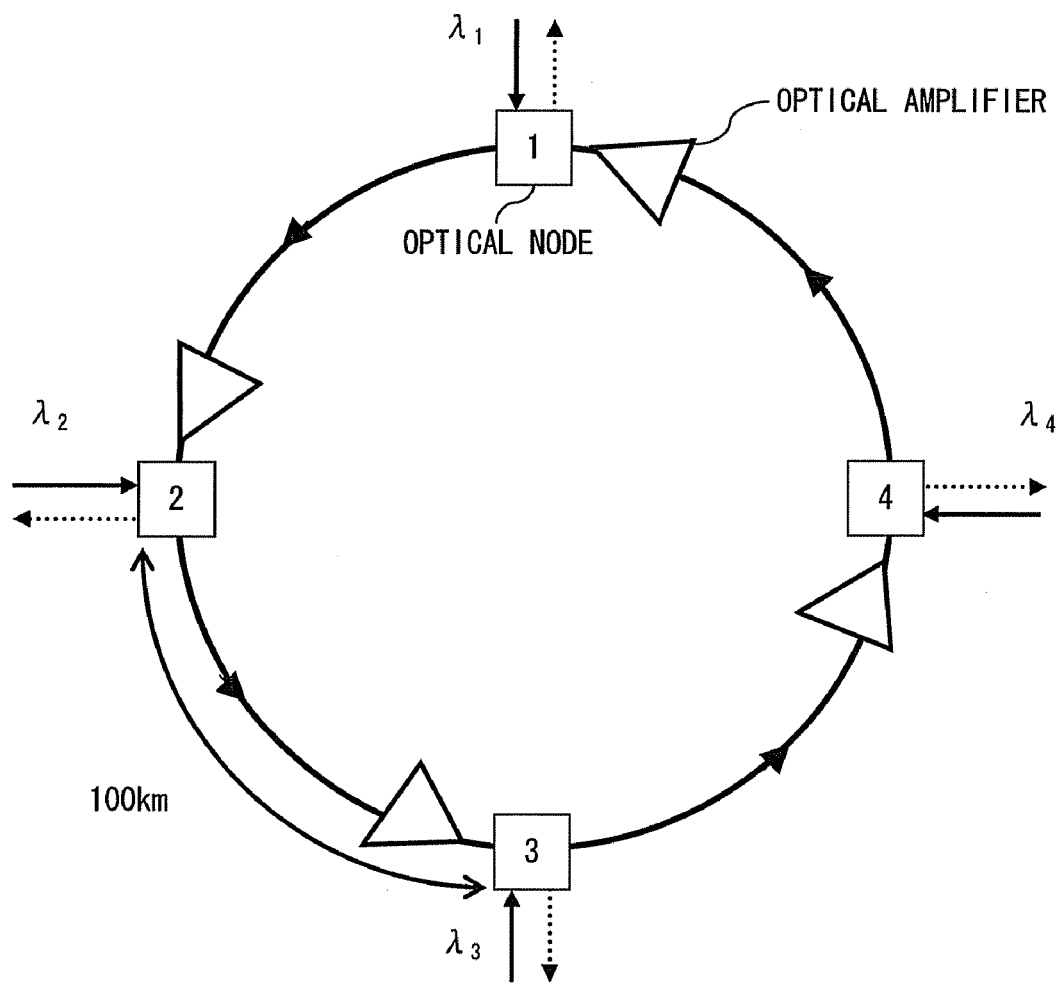
FIG. 1 shows a conventional long distance optical network.
Figure 2:
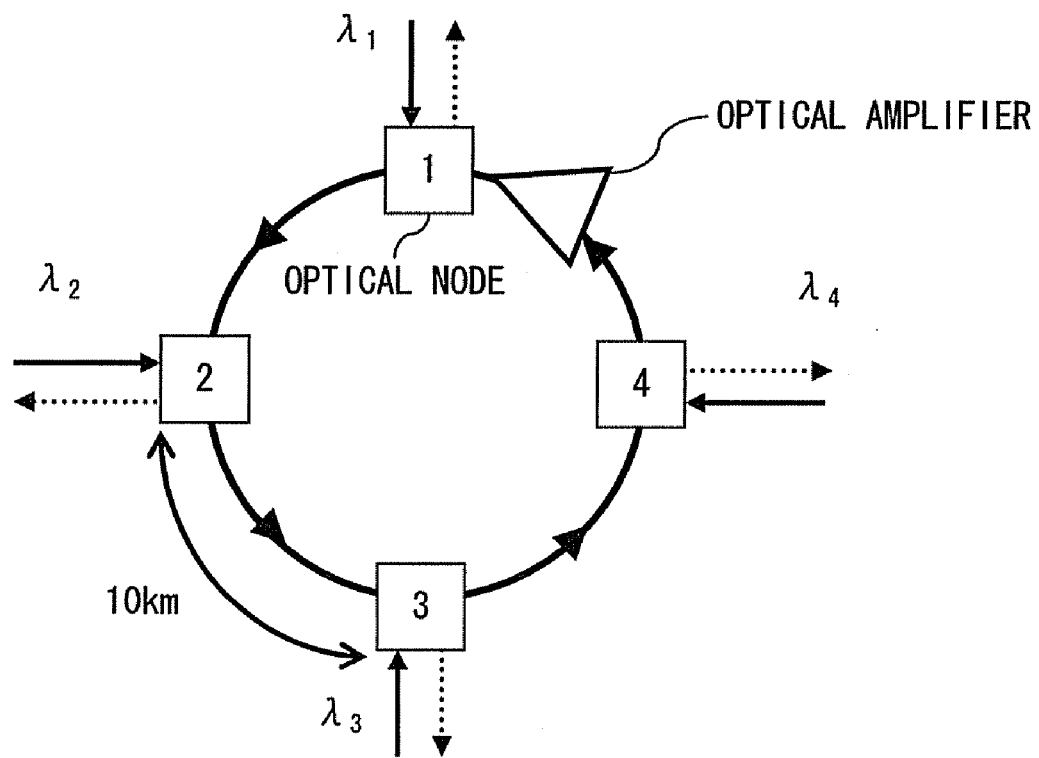
FIG. 2 shows a conventional short distance optical network.
Figure 3:
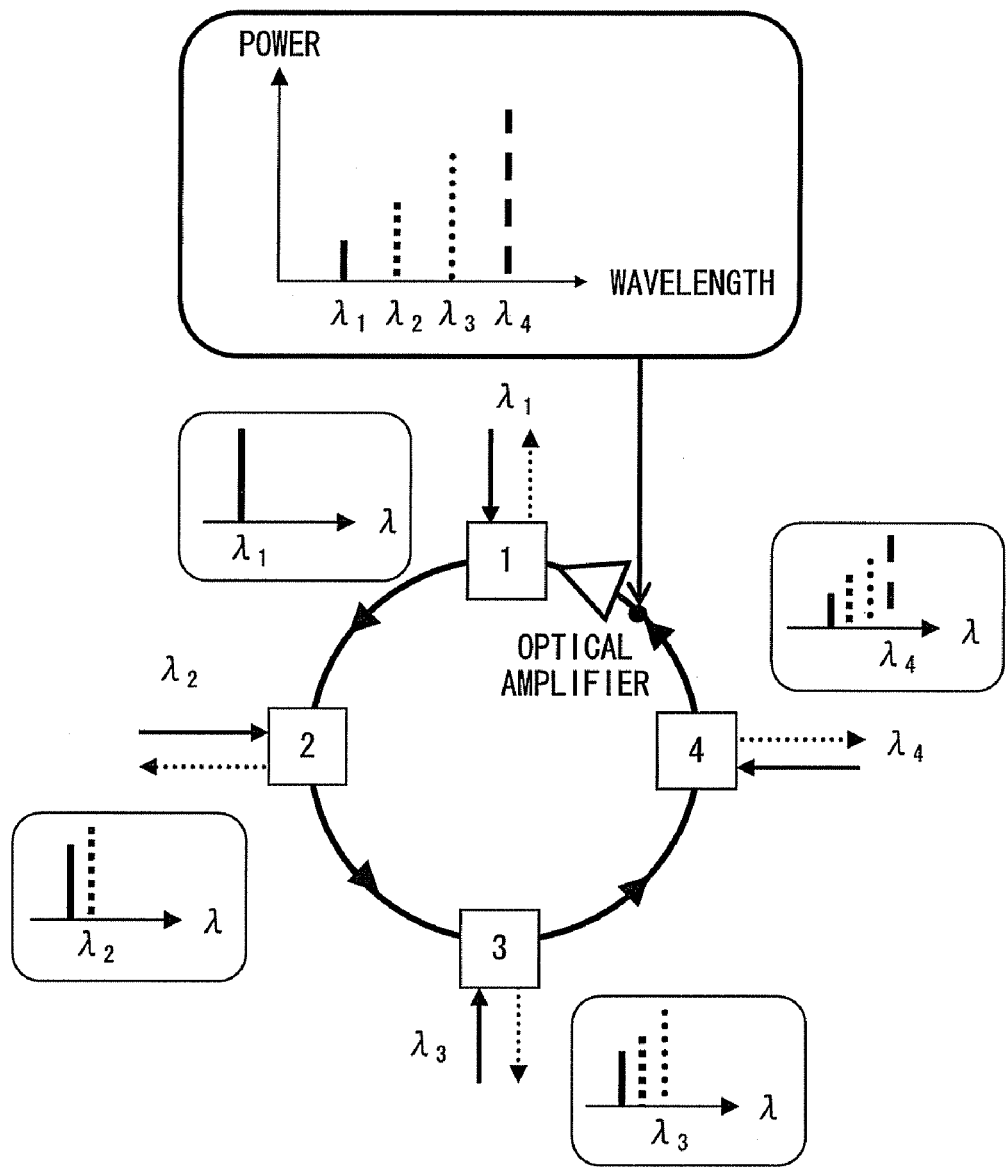
FIG. 3 shows a problem in the conventional technique.
Figure 4:
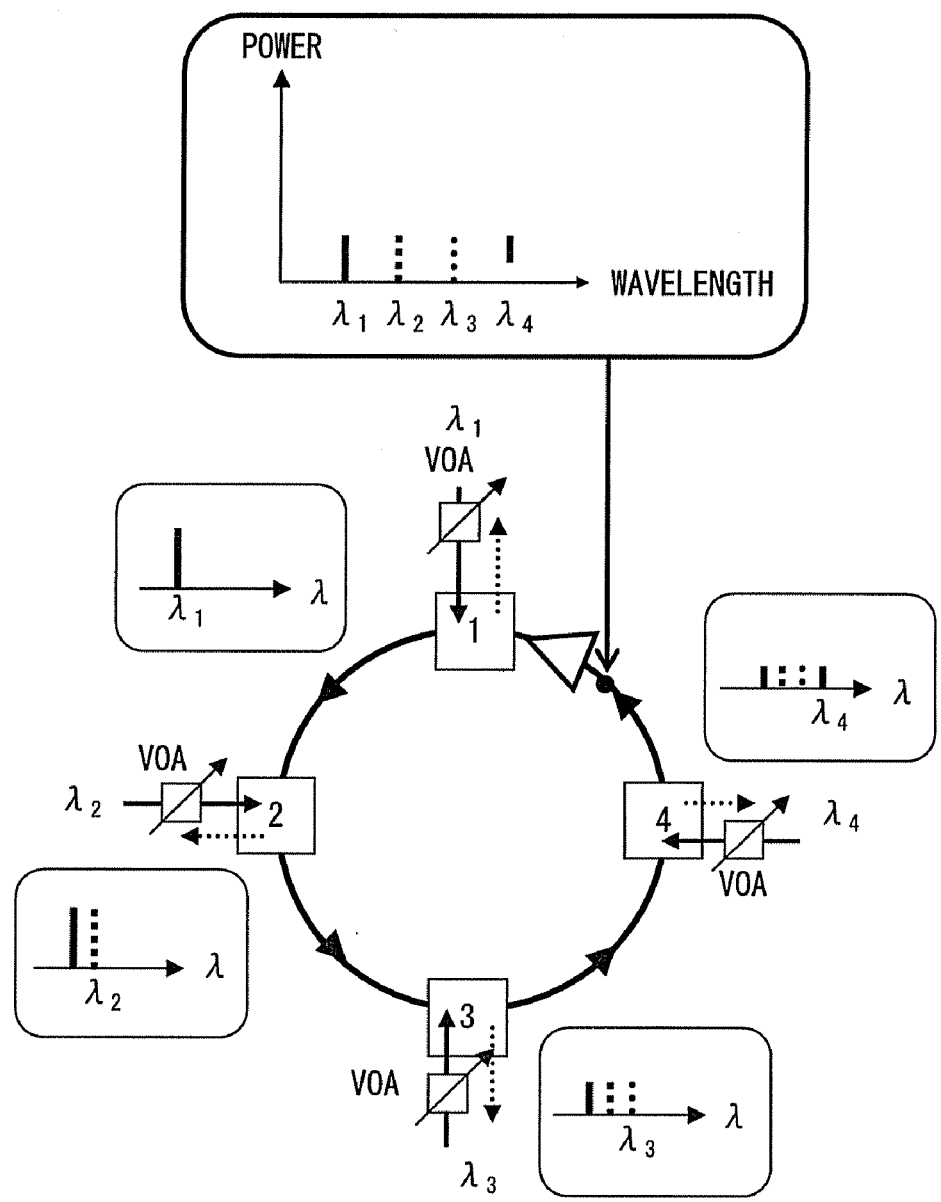
FIG. 4 schematically shows the system described in Patent Document 1.

FIG. 7 shows a configuration of an optical network system according to one embodiment of the present invention. An optical network system 100 comprises two optical add/drop nodes (optical add/drop multiplexers) 10, an optical transmission path 20 that connects the optical add/drop nodes 10, and optical amplifiers 31 and 32. The optical transmission path 20 comprises a counterclockwise optical transmission path 21 and a clockwise optical transmission path 22. The optical amplifier 31 amplifies an optical signal on the counterclockwise optical transmission path 21 and the optical amplifier 32 amplifies an optical signal on the clockwise optical transmission path 22.

To the optical add/drop nodes 10, communication devices (not shown) such as, for example, gateway devices, routers, terminals or the like are connected. Each optical add/drop node 10 adds to the optical transmission path 20 optical signals that are transmitted from its corresponding communication devices and drops signals from the optical transmission path 20 to guide the signals to its corresponding communication devices. It is also possible for each optical add/drop node 10 to generate signals by itself and to add the signals to the optical transmission path 20, and to receive optical signals dropped from the optical transmission path 20.

Optical add/drop node (#1) 10 splits an optical signal with a wavelength λ1, generates first and second split signals, adds the first split signal to the counterclockwise optical transmission path 21, and adds the second split signal to the clockwise optical transmission path 22. Similarly, optical add/drop node (#2) 10 splits an optical signal with a wavelength λ2, adds the first split signal to the counterclockwise optical transmission path 21, and adds the second split signal to the clockwise optical transmission path 22. As a result of this, both paths, the counterclockwise optical transmission path 21 and the clockwise optical transmission path 22, transmit the WDM light including the signals with the wavelengths λ1 and λ2 that are multiplexed. Also, optical add/drop node (#1) 10 obtains the optical signal with the wavelength λ1 from the WDM light transmitted through the counterclockwise optical transmission path 21 or the clockwise optical transmission path 22. Similarly, the optical add/drop node (#2) 10 obtains the optical signal with the wavelength λ2 from the WDM light transmitted through the counterclockwise optical transmission path 21 or the clockwise optical transmission path 22. The configuration and method of obtaining the corresponding signals from the optical transmission path 20 at the optical add/drop nodes 10 do not directly relate to the present invention, thus the detailed explanation thereof is omitted hereinafter.

The optical amplifiers 31 and 32 are WDM optical amplifiers that respectively amplify the WDM light transmitted through the counterclockwise optical transmission path 21 and clockwise optical transmission path 22. It is to be noted that although the optical amplifiers 31 and 32 are arranged in close proximity to each other in this embodiment, these amplifiers can be provided not close to each other.

Figure 8:
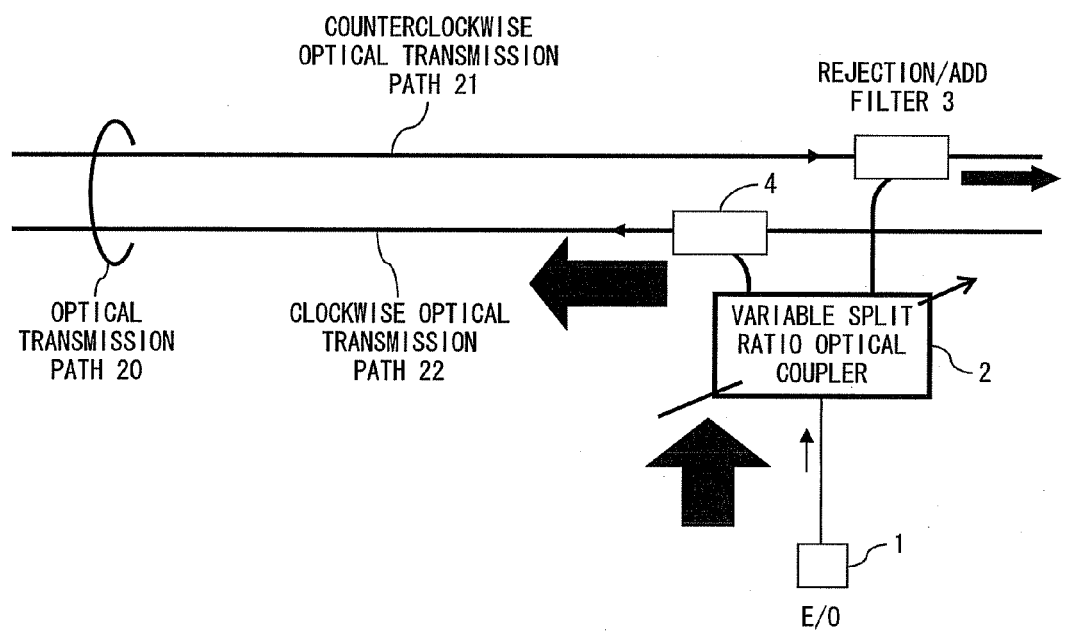
FIG. 8 shows the first example of an add unit in an optical add/drop node.

FIG. 8 shows an example of the optical add/drop node 10. In this figure, only the add unit for adding optical signals to the optical transmission path 20 is shown, and the drop unit for obtaining the corresponding optical signals from the optical transmission path 20 is not shown.

A transmitter (E/O) 1 generates optical signals that are to be added to the optical transmission path 20. The transmitter 1 provided in optical add drop node (#1) 10 generates optical signals with the wavelength λ1, and the transmitter 1 provided in optical add drop node (#2) 10 generates optical signals with the wavelength λ2. It is to be noted that the configuration of the transmitter 1 is not limited to any particular configuration, and can be implemented by, for example, a transponder that is commonly and commercially available. Also, the transmitter 1 may be an electronic/optical conversion element that converts electric signals received from the communication devices connected to its optical add/drop node 10 into optical signals, and also may be a wavelength converter that converts wavelength of received optical signals into appropriate wavelength.

Figure 9:
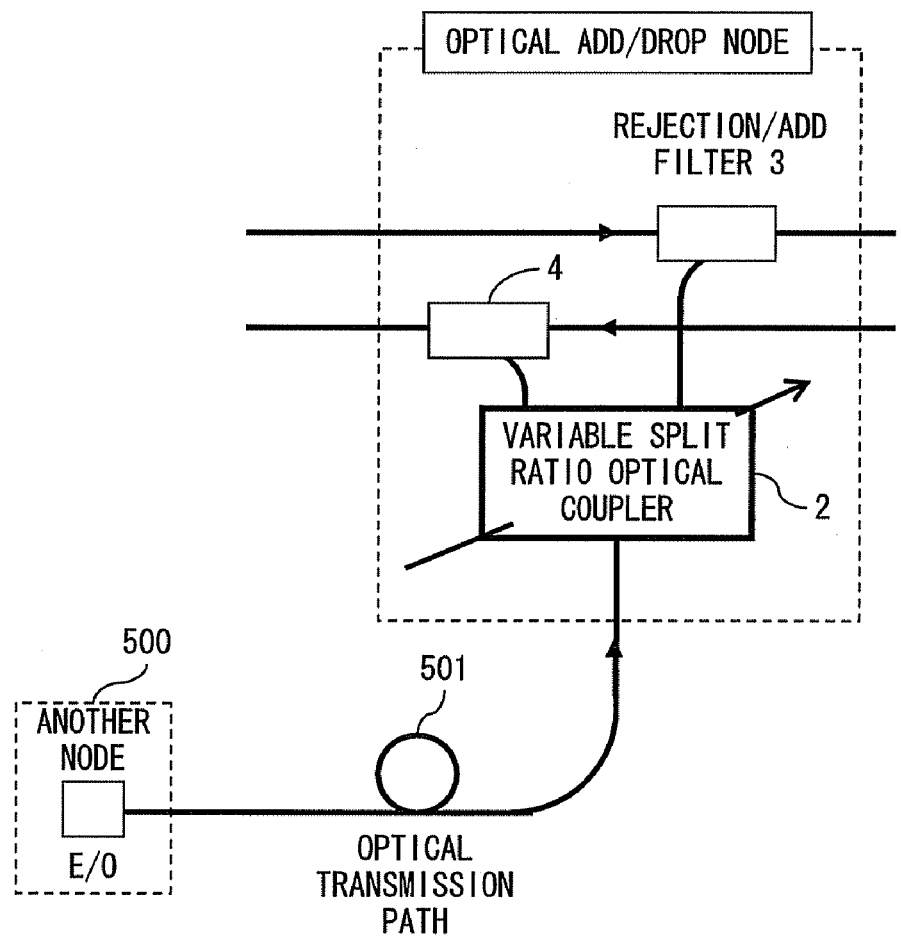
FIG. 9 shows an example of an add unit in an optical add/drop node that does not include a transmitter.

It is also possible to employ a configuration in which, when the signal that is to be added is an optical signal that has been transmitted from another node, that has a wavelength available in the optical network to which the signal is to be added, and that has a sufficient optical S/N ratio and sufficient optical power, the signal is directly input into the variable split ratio coupler without using the transmitter. A configuration of the optical add/drop node for this case is shown in FIG. 9. In FIG. 9, optical signals transmitted from the optical transmitter (E/O) provided in another node 500 are transmitted through an optical transmission path 501 and are fed to the optical add/drop node according to the present embodiment.

A variable split ratio optical coupler 2 splits the optical signal output from the transmitter 1, and generates the first and second split signals. The configuration of the variable split ratio optical coupler 2 is not particularly limited, and the variable split ratio optical coupler 2 can be implemented by, for example, a Polarization Maintaining Variable Ratio Evanescent Wave Coupler that is commercially available from Canadian Instrumentation and Research, Ltd. It is also possible for the variable split ratio optical coupler 2 to be configured in such a way that the operation principle is utilized in which an optical split ratio is made variable by arranging an active medium that changes the refractive index profile in the vicinity of the drawn and fused portion of the optical coupler (as disclosed in, for example, Japanese Patent Application Publication 2-311804), or in such a way that the variable split ratio optical coupler 2 is realized by an optical waveguide device (as disclosed in, for example, Journal of Lightwave Technology, Vol. 14, No. 10, pp 2301-2310 by K. Jinguji et.

al). Additionally, Japanese Patent Application Publication No. 2001-339344 also discloses a specific example of a variable split ratio coupler.

Figure 10:
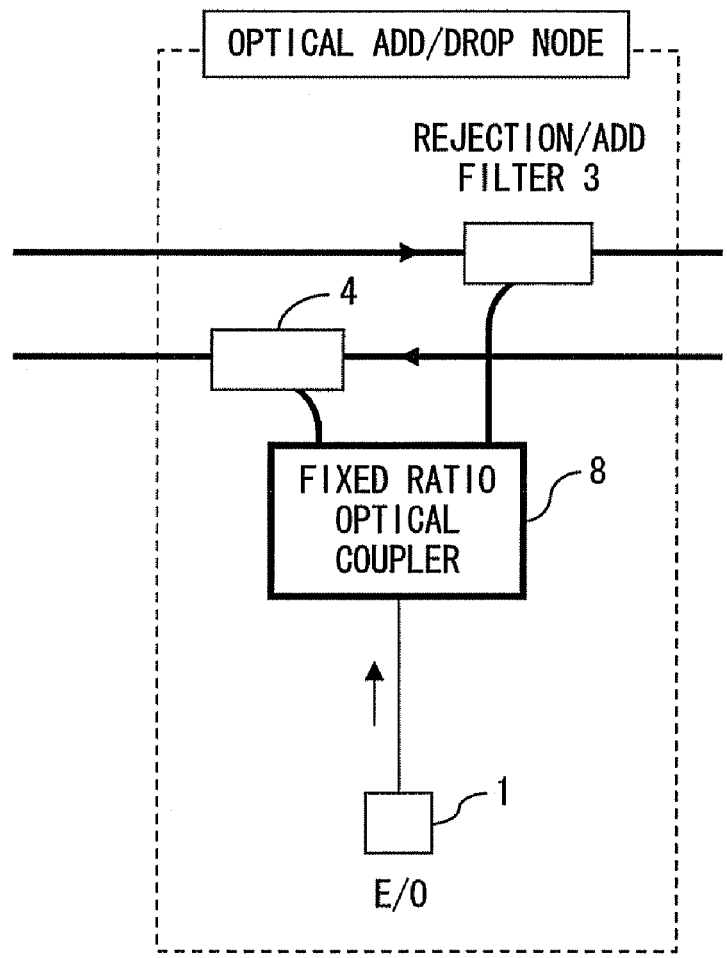
FIG. 10 shows an example of an add unit in an optical add/drop node using a fixed ratio coupler.

In the above configuration, the variable split ratio coupler may be an optical coupler that splits signals at a particular and appropriate ratio. However, when the split ratio is to be changed, a new optical coupler that splits signal at the required split ratio has to be added at a specific point. In this case, a fused optical fiber coupler or other such device can be used. This type of optical coupler can be designed to split signal at an arbitrary split ratio, and thus can be applied to the present invention. The configuration of the optical add/drop node in this case is shown in FIG. 10. In FIG. 10, a fixed ratio optical coupler 8 is used.

Rejection/add filters 3 and 4 respectively add to the counterclockwise optical transmission path 21 and clockwise optical transmission path 22 the first split signal and the second split signal obtained from the variable split ratio optical coupler 2. Also, the rejection/add filters 3 and 4 respectively block optical signals with the same wavelength as that of the optical signal output from the corresponding transmitter 1 among the WDM light respectively through the counterclockwise optical transmission path 21 and the clockwise optical transmission path 22. Specifically, the rejection/add filters 3 and 4 provided in optical add/drop node (#1) 10 block optical signals with the wavelength λ1 among the WDM light transmitted through the optical transmission path 20. The rejection/add filters 3 and 4 provided in optical add/drop node (#2) 10 block optical signals with the wavelength λ2 among the WDM light transmitted through the optical transmission path 20.

Additionally, by employing the configuration in which optical signals output from a plurality of transmitters are coupled by using, for example, an optical coupler having a ratio of N:1 (i.e., an optical coupler having N inputs and one output) or a plurality of rejection/add filters being connected in series, and in which the coupled signals are fed to the variable split ratio optical coupler 2, it is possible to add a plurality of optical signals with different wavelengths to the optical transmission path 20 through one optical add/drop node.

Figure 11:
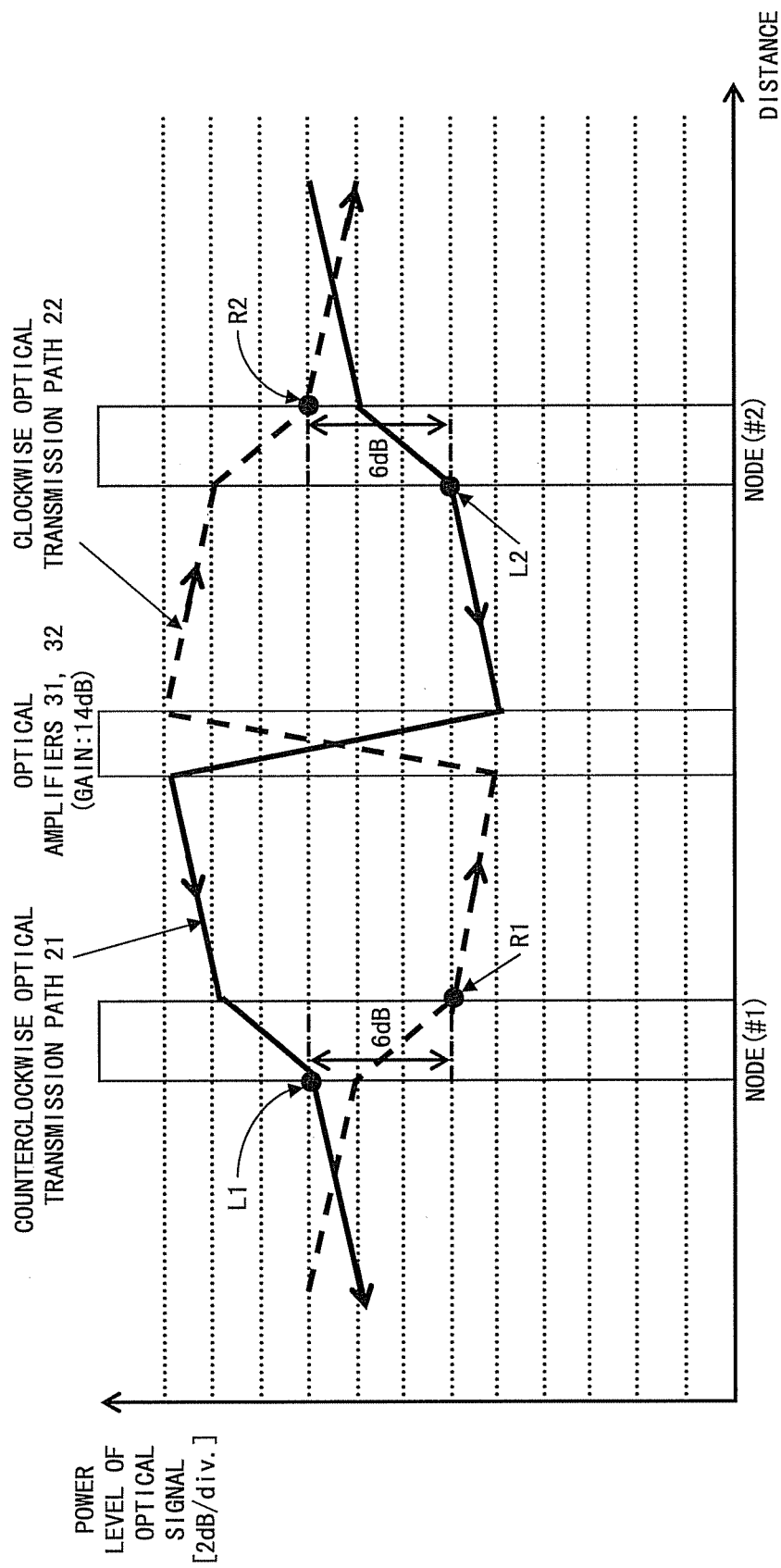
FIG. 11 is a diagram showing the power levels of optical signals in the optical network system shown in FIG. 7.

FIG. 11 is a diagram showing the power levels of the optical signals in the optical network system shown in FIG. 7. It is assumed that the losses on the transmission paths between optical add/drop node (#1) 10 and optical add/drop node (#2) 10, between optical add/drop node (#1) 10 and the optical amplifiers 31/32, and between the optical amplifiers 31/32 and optical add/drop node (#2) 10 are respectively 2 dB (corresponding to approximately 10 km) in the configuration shown in FIG. 7. Also, the transmission loss at each optical add/drop node 10 is 4 dB. Also, the optical power of the signal added through the optical add/drop node 10 to the counterclockwise optical transmission path 21 and the optical power of the signal added through the optical add/drop node 10 to the clockwise optical transmission path 22 are adjusted such that they are equal to each other at the input ports of the optical amplifiers 31 and 32. In addition, it is assumed that the gains of the respective optical amplifiers 31 and 32 are set such that the optical power of a signal that was transmitted from an arbitrary optical add/drop node and returned to that optical add/drop node after being transmitted through this network is equal to that of the signal to be transmitted from that optical add/drop node. In this example, the gain is 14 dB for each optical amplifier 31 and 32.

Optical add/drop node (#1) 10 adds to the counterclockwise optical transmission path 21 a signal having the optical power L1. Then, the optical power of this signal is decreased by 2 dB on the optical transmission path from optical add/drop node (#1) 10 to optical add/drop node (#2) 10, is decreased by 4 dB in optical add/drop node (#2) 10, and is further decreased by 2 dB on the optical transmission path from optical add/drop node (#2) 10 to the optical amplifier 31. In other words, the optical power of this signal becomes "L1−6(=L2)" dBm at the output port of optical add/drop node (#2) 10, and becomes "L1−8" dBm at the input port of the optical amplifier 31. Thereafter, the optical power of this signal is increased by 14 dB by the optical amplifier 31, is decreased by 2 dB on the optical transmission path from the optical amplifier 31 to optical add/drop node (#1) 10, and is decreased by 4 dB in optical add/drop node (#1) 10, accordingly it returns to "L1" dBm.

Also, optical add/drop node (#1) 10 adds to the clockwise optical transmission path 22 a signal having the optical power R1. Then, the optical power of this signal is decreased by 2 dB on the optical transmission path from optical add/drop node (#1) 10 to the optical amplifier 32. In other words, the optical power of this signal becomes "R1−2" dBm at the input port of the optical amplifier 32. Thereafter, the optical power of this signal is increased by 14 dB by the optical amplifier 32, is decreased by 2 dB on the optical transmission path from the optical amplifier 32 to optical add/drop node (#2) 10, is decreased by 4 dB in optical add/drop node (#2) 10, is decreased by 2 dB on the optical transmission path from optical add/drop node (#2) 10 to optical add/drop node (#1) 10, and is further decreased by 4 dB in optical add/drop node (#1) 10, accordingly it returns to "R1" dBm. At this moment, the optical power of this signal is "R1−6(=R2)" dBm at the output port of optical add/drop node (#2) 10.

In the above, the optical power of the signal added to the counterclockwise optical transmission path 21 and the optical power of the signal added to the clockwise optical transmission path 22 respectively through the optical add/drop node 10 are adjusted be equal to each other at the input ports of the optical amplifiers 31 and 32. Accordingly, "L1−8" and "R1−2" are equal to each other, and "L1−6=R1" is obtained. In other words, in optical add/drop node (#1) 10, the optical power R1 of the signal that is to be added to the clockwise optical transmission path 22 is set to be lower by 6 dB than the optical power L1 of the signal that is to be added to the counterclockwise optical transmission path 21. Similarly, "R2−8" and "L2−2" are equal to each other, and "R2−6=L2" is obtained. In other words, in optical add/drop node (#2) 10, the optical power L2 of the signal that is to be added to the counterclockwise optical transmission path 21 is set to be lower by 6 dB than the optical power R1 of the signal that is to be added to the clockwise optical transmission path 22.

As described above, on the optical transmission path 20 in the optical network system 100, the optical power of the signal that is to be added to the counterclockwise optical transmission path 21 and the optical power of the signal that is to be added to the clockwise optical transmission path 22 respectively through the optical add/drop node 10 are different from each other. The adjustment of the optical power of this pair of signals is realized by appropriately setting the split ratio in the variable split ratio optical coupler 2 in each optical add/drop node 10. Specifically, in order to make the optical power of the first split signal that is to be added to the counterclockwise optical transmission path 21 higher by 6 dB than the optical power of the second split signal that is to be added to the clockwise optical transmission path 22, the optical signal output from the transmitter 1 is split at the ratio of "first split signal:second split signal=4:1" in optical add/drop node (#1) 10. In other words, the split ratio in the variable split ratio optical coupler 2 is set to "4:1". Similarly, in optical add/drop node (#2) 10, in order to make the optical power of the first split signal to be added to the counterclockwise optical transmission path 21 lower by 6 dB than the optical power of the second split signal to be added to the clockwise optical transmission path 22, the split ratio in the variable split ratio optical coupler 2 is set to "1:4". Thereby, the outcome in the diagram of the optical power levels as shown in FIG. 11 is realized. It is to be noted that the transmission power levels of each of the transmitters 1 are assumed to be equal to one another among the respective optical add/drop nodes 10.

Figure 12:
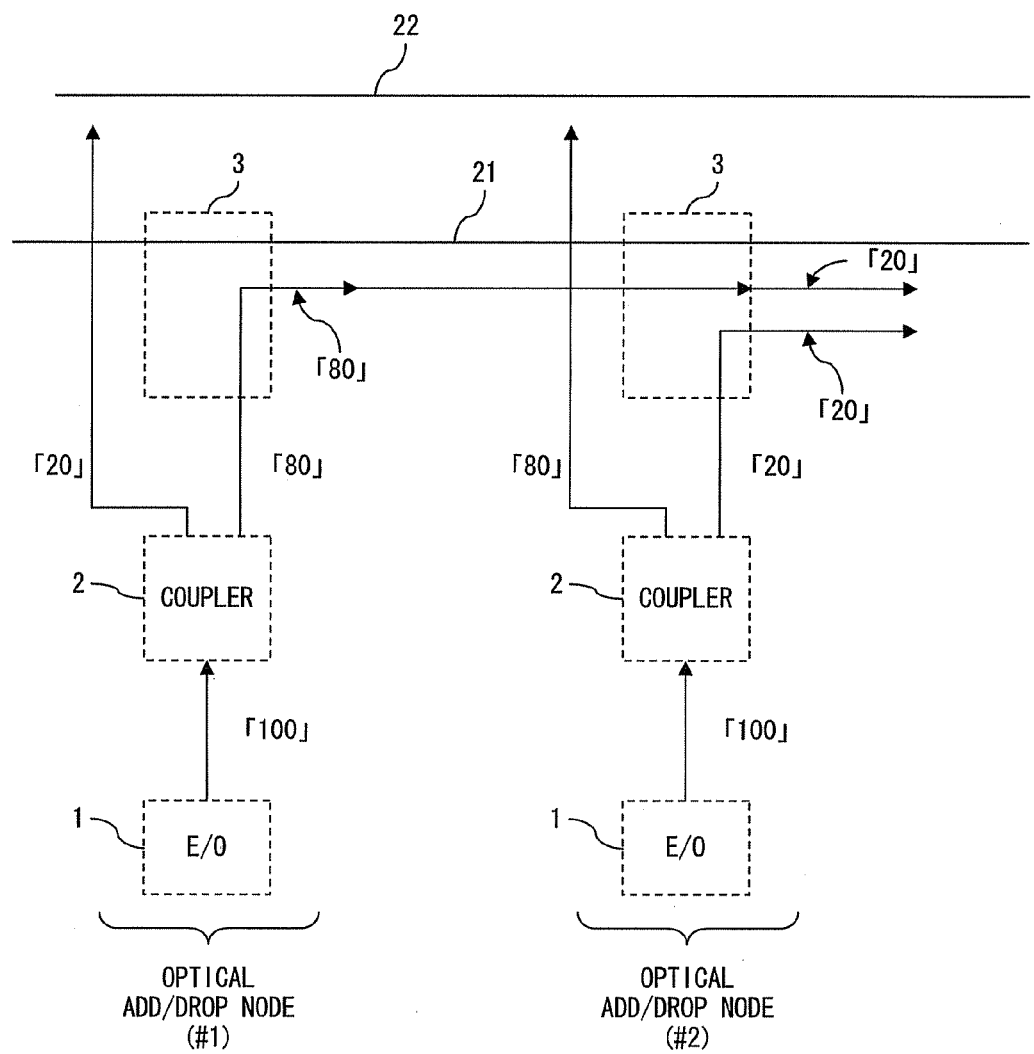
FIG. 12 schematically shows the optical power of signals transmitted in the optical network system shown in FIG. 7.

FIG. 12 schematically shows the optical power of each of the signals transmitted in the optical network system shown in FIG. 7. Here, the optical power of each of the signals transmitted from the transmitters 1 in the respective optical add/drop nodes 10 is represented by the value of "100" (this value is only for explanations).

In optical add/drop node (#1) 10, the optical signal output from the transmitter 1 is split by the variable split ratio optical coupler 2 at the ratio of "4:1". Accordingly, the optical power of the first split signal and the optical power of the second split signal are respectively "80" and "20". Then, the first split signal is added to the counterclockwise optical transmission path 21. In this configuration, the loss caused on the transmission path from optical add/drop node (#1) 10 to optical add/drop node (#2) 10 is 2 dB, and the loss in optical add/drop node (#2) 10 is 4 dB. Accordingly, the optical power of the signal that was added to the counterclockwise optical transmission path 21 through optical add/drop node (#1) 10 has been decreased by 6 dB at the output port of optical add/drop node (#2) 10. In other words, the optical power has become approximately one-fourth. Therefore, the optical power of the signal added to the counterclockwise optical transmission path 21 through optical add/drop node (#1) 10 is "20" at the output port of optical add/drop node (#2) 10.

In optical add/drop node (#2) 10, the optical signal output from the transmitter 1 is split by the variable split ratio optical coupler 2 at the ratio of "1:4". Accordingly, the optical power of the first split signal and the optical power of the second split signal are respectively "20" and "80". Then, the first split signal is added to the counterclockwise optical transmission path 21. Accordingly, the optical power of the signal added to the counterclockwise optical transmission path 21 through optical add/drop node (#2) 10 is also "20" at the output port of optical add/drop node (#2) 10. In other words, the optical powers of the signals added to the counterclockwise optical transmission path 21 through optical add/drop nodes (#1 and #2) 10 are equal to each other at any monitoring point on the counterclockwise optical transmission path 21. This means that the optical power levels at the respective wavelengths in the WDM light including the signals added through the respective optical add/drop nodes 10 are approximately equal to one another. Similarly, the optical power levels at the respective wavelengths in the WDM light are approximately equal to one another on the clockwise optical transmission path 22.

As described above, it is possible to make the optical power of each of the optical signals included in the WDM light equal to or approximately equal to one another in the optical network system 100 by appropriately setting the split ratios of the variable split ratio optical couplers 2 in the respective optical add/drop nodes 10.

FIG. 13 shows a configuration of an optical network system according to another embodiment of the present invention. An optical network system 200 comprises four optical add/drop nodes (#1 through #4) 10, the optical transmission path 20 comprising a counterclockwise optical transmission path 21 and a clockwise optical transmission path 22, and the optical amplifiers 31 and 32.

Figure 14:
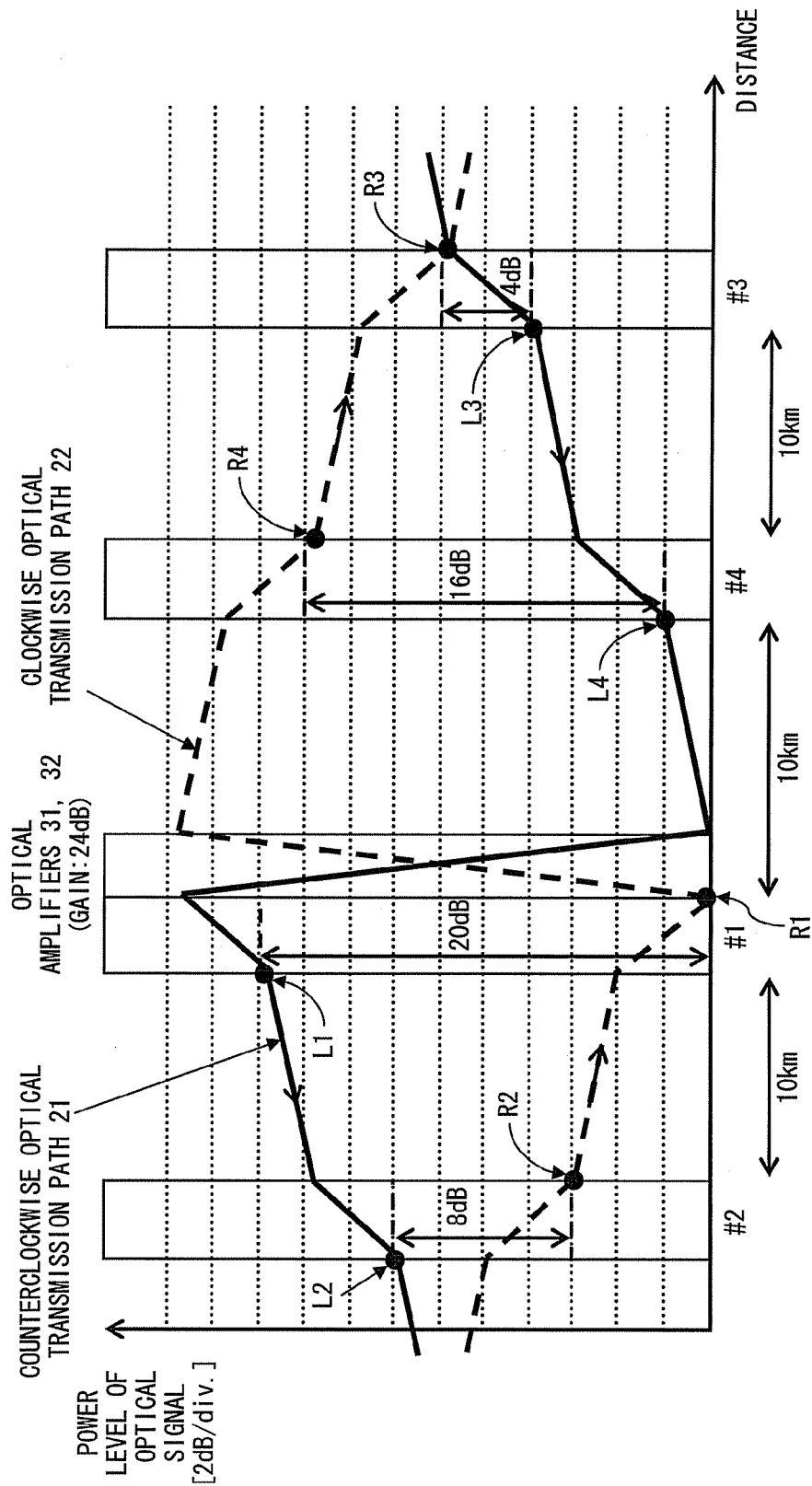
FIG. 14 is a diagram showing the power levels of optical signals in the optical network system shown in FIG. 13.

FIG. 14 is a diagram showing the power levels of the optical signals in the optical network system shown in FIG. 13. It is assumed that the losses between the optical add/drop nodes (#1 through #4) 10 are respectively 2 dB (corresponding to approximately 10 km) in the configuration shown in FIG. 13. The optical amplifiers 31 and 32 are provided between optical add/drop node (#1) 10 and optical add/drop node (#4) 10, and adjacently to optical add/drop node (#1) 10. The other conditions are the same as those shown in FIG. 11. However, the gains of the optical amplifiers 31 and 32 are respectively 24 dB when they are set on the basis of the conditions explained with reference to FIG. 11.

Optical add/drop node (#1) 10 adds to the counterclockwise optical transmission path 21 the signal having the optical power L1. Then, the optical power of this signal is decreased by 2 dB on the respective optical transmission paths that connect the optical add/drop nodes 10, and is decreased by 4 dB in the respective optical add/drop nodes 10. Thereby, the optical power of this signal is "L1−20" dBm at the input port of the optical amplifier 31. The optical power of this signal is "L1−6(=L2)" dBm at the output port of optical add/drop node (#2) 10, is "L1−12(=L3) dBm at the output port of optical add/drop node (#3) 10, and is "L1−18 (=L4) dBm at the output port of optical add/drop node (#4) 10.

Similarly, optical add/drop node (#1) 10 adds to the clockwise optical transmission path 22 a signal having the optical power R1. In this configuration, because the optical amplifier 32 is provided adjacently to optical add/drop node (#1) 10, the optical power of the signal at the input port of the optical amplifier 32 is "R1" dBm. The optical power of this signal is attenuated on the transmission paths and in the optical add/drop nodes 10 after being amplified by 24 dB by the optical amplifier 32. Thus, the optical power of this signal is "R1+18 (=R4)" dBm at the output port of optical add/drop node (#4) 10, is "R1+12(=R3)" dBm at the output port of optical add/drop node (#3) 10, and is "R1+6(=R2)" dBm at the output port of optical add/drop node (#2) 10.

In this configuration, the optical power of one signal and the optical power of another signal respectively added through the optical add/drop node 10 are equal to each other at the input ports of the optical amplifiers 31 and 32. Accordingly, "L1−20" and "R1" are equal to each other, and "L1−20=R1" is obtained. In other words, in optical add/drop node (#1) 10, the optical power R1 of the signal to be added to the clockwise optical transmission path 22 is set to be lower by 20 dB than the optical power L1 of the signal to be added to the counterclockwise optical transmission path 21.

In optical add/drop node (#2) 10, "L2−8=R2" is obtained on the basis of the equations "L2=L1−6" and "R2=R1+6". Similarly, in optical add/drop node (#3) 10, "L3+4=R3" is obtained, and in optical add/drop node (#4) 10, "L4+16=R4" is obtained. In other words, in optical add/drop node (#2) 10, the optical power R2 of the signal to be added to the clockwise optical transmission path 22 is set to be lower by 8 dB than the optical power L2 of the signal to be added to the counterclockwise optical transmission path 21. Also, in optical add/drop node (#3) 10, the optical power R3 of the signal to be added to the clockwise optical transmission path 22 is set to be higher by 4 dB than the optical power L3 of the signal to be added to the counterclockwise optical transmission path 21. Further, in optical add/drop node (#4) 10, the optical power R4 of the signal to be added to the clockwise optical transmission path 22 is set to be higher by 16 dB than the optical power L4 of the signal to be added to the counterclockwise optical transmission path 21.

Then, in order to realize the optical power diagram shown in FIG. 14, the split ratios of the variable split ratio optical couplers 2 in the respective optical add/drop nodes (#1 through #4) 10 are set as below. In optical add/drop node (#1) 10, in order to set the optical power of the first split signal that is to be added to the counterclockwise optical transmission path 21 to be higher by 20 dB than the optical power of the second split signal that is to be added to the clockwise optical transmission path 22, the optical signal output from the transmitter 1 is split at the ratio of "first split signal:second split signal=99:1". In other words, the split ratio of the variable split ratio optical coupler 2 is set to "99:1". Similarly, in optical add/drop nodes (#2, #3, and #4) 10, the split ratios of the variable split ratio optical couplers 2 are respectively set to "100:16", "2:5", and "1:40".

However, in the optical network system 200, the split ratios of the variable split ratio optical couplers 2 are different from one another among the respective optical add/drop nodes (#1 through #4) 10. Therefore, the optical power of the signals output from the transmitters 1 has to be appropriately adjusted in order to realize the optical power diagram shown in FIG. 14. Specifically, it is desired that the total optical power of the first and second split signals to be added to the optical transmission path 20 through one optical add/drop node 10 be equal to the total optical power of a pair of signals arrived at the optical add/drop node 10 after being transmitted via the optical transmission path 20 from another arbitrary optical add/drop node 10. In this case, if, for example, the optical power of the signal output from the transmitter 1 in optical add/drop node (#1) 10 is not adjusted, it is necessary to attenuate the signals output from the transmitters 1 in optical add/drop nodes (#2, #3, and #4) 10 by "5.4 dB", "6.6 dB", and "1.9 dB", respectively.

Figure 16:
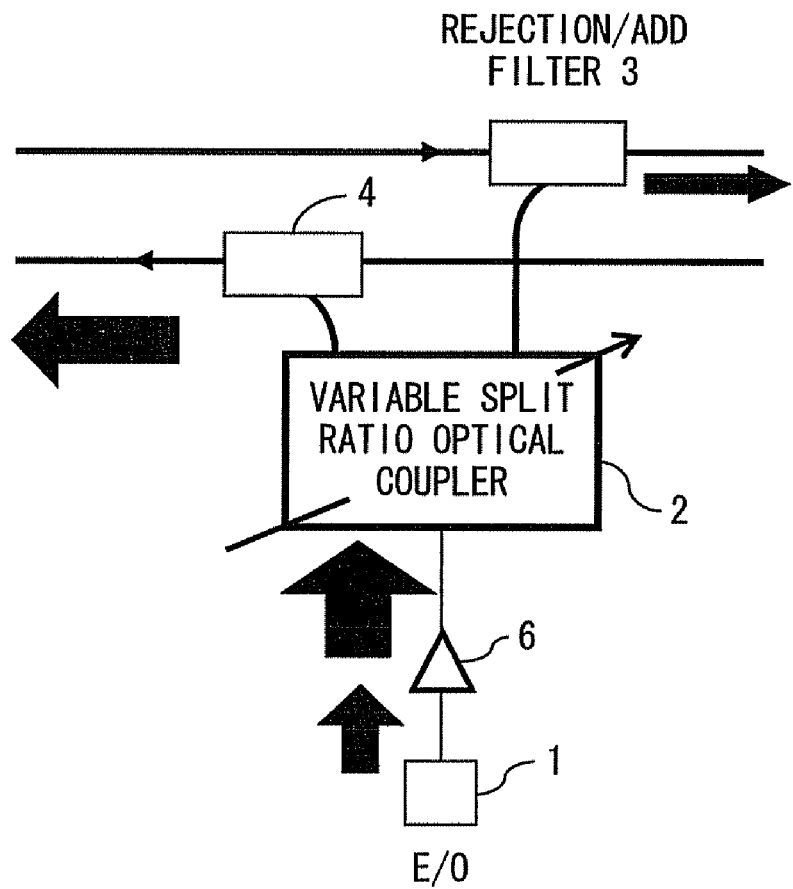
FIG. 16 shows the third example of an add unit in an optical add/drop node.
Figure 17:
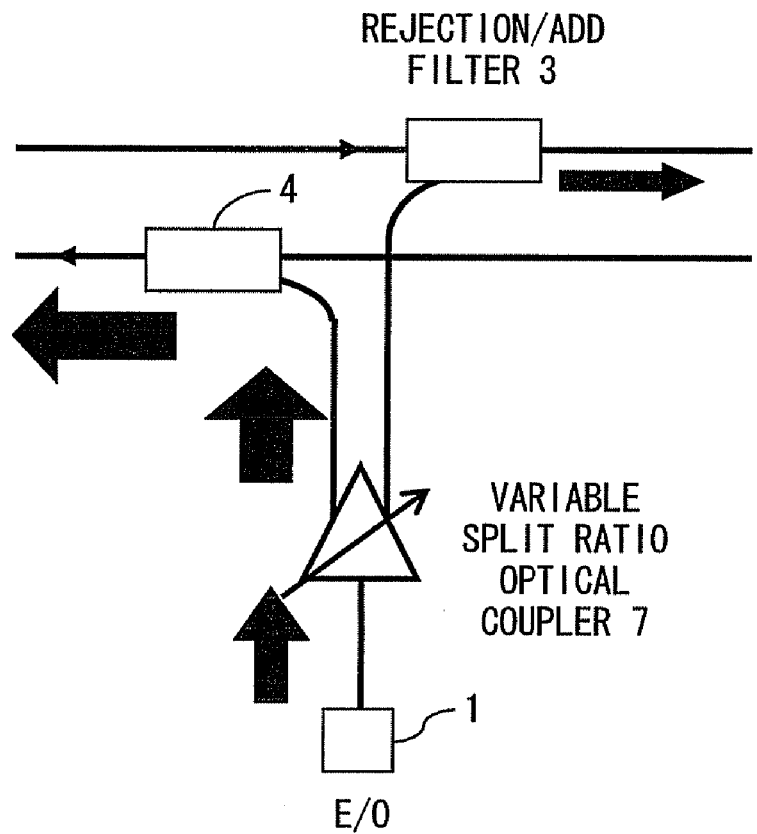
FIG. 17 shows the fourth example of an add unit in an optical add/drop node.

FIGS. 15 through 17 show examples of add units in the optical add/drop nodes used in the optical network system 200. These optical add/drop nodes 10 comprise a function for adjusting the optical power of each of the signals output from the transmitters 1. Note that the transmitter 1, the variable split ratio optical coupler 2, and the rejection/add filters 3 and 4 are the same as those in the explanations with reference to FIG. 8.

The optical add/drop node 10 shown in FIG. 15 comprises a variable optical attenuator (VOA) 5 between the transmitter 1 and the variable split ratio optical coupler 2. The variable optical attenuator 5 attenuates the optical signal output from the transmitter 1. Thereby, it is possible to adjust the total of the optical power of the first and second split signals generated by the variable split ratio optical coupler 2.

The optical add/drop node 10 shown in FIG. 16 comprises an optical amplifier 6 between the transmitter 1 and the variable split ratio optical coupler 2. The optical amplifier 6 amplifies the optical signal output from the transmitter 1. It should be noted that even when the optical power of the signal from the transmitter 1 is not sufficiently high, this configuration can still operate. It is also possible for the optical amplifier 6 to have functions equivalent to the variable optical attenuator 5 shown in FIG. 15 by adjusting the gain.

The optical add/drop node 10 shown in FIG. 17 comprises a variable split ratio optical amplifier 7 between the transmitter 1 and the rejection/add filters 3 and 4. The variable split ratio optical amplifier 7 has the functions of both the optical amplifier 6 and the variable split ratio optical coupler 2, and is realized by including a variable split ratio optical coupler in an optical amplifier.

It is to be noted that the configuration in which the total of the optical power of the first and second split signals generated by the variable split ratio optical coupler 2 is adjusted is not limited to any of the examples shown in FIGS. 15 through 17, and can be, for example, a configuration in which a variable split ratio optical coupler includes the VOA function, or a configuration in which the optical power of a transmitter itself is adjusted.

Figure 18:
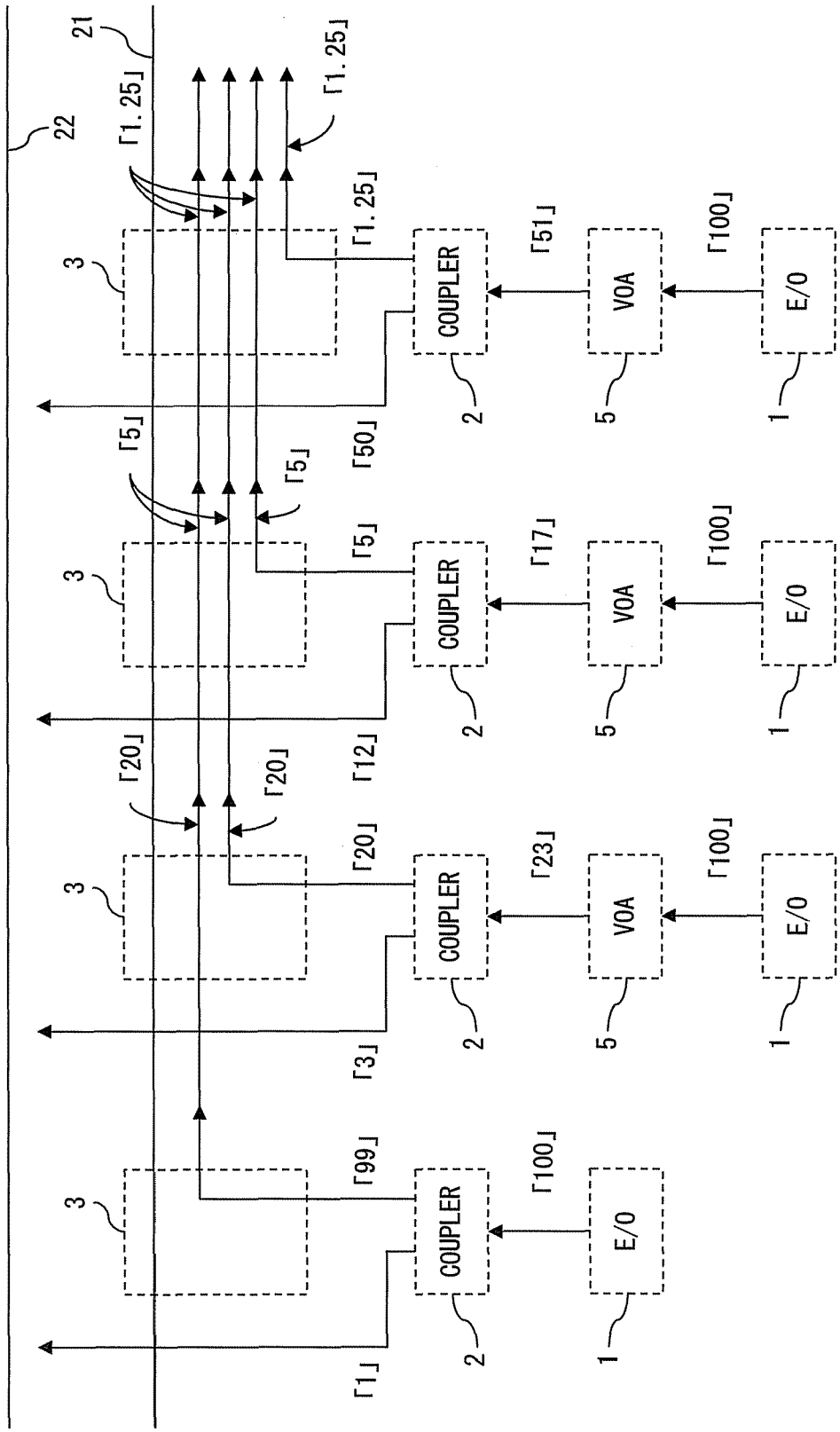
FIG. 18 schematically shows the optical power of signals transmitted in the optical network system shown in FIG. 13.

FIG. 18 schematically shows the optical power of each of the signals transmitted in the optical network system shown in FIG. 13. Here, the optical power of each of the signals transmitted from the transmitters 1 in the respective optical add/drop nodes 10 is represented by the value "100". Note that in order to simplify the explanation, the precision of the values representing the optical power is sacrificed slightly in the explanation below.

In optical add/drop node (#1) 10, the optical signal output from the transmitter 1 is split by the variable split ratio optical coupler 2 at the ratio of "99:1". Accordingly, the optical power of the first split signal and the optical power of the second split signal are respectively "99" and "1". Then, the first split signal is added to the counterclockwise optical transmission path 21. In this configuration, as explained with reference to FIG. 12, the optical power of a signal added through one optical add/drop node becomes approximately one-fourth at the output port of the next optical add/drop node 10. Accordingly, the optical power of the signal added to the counterclockwise optical transmission path 21 through optical add/drop node (#1) 10 is approximately "20" at the output port of optical add/drop node (#2) 10.

The second split signal that was added to the clockwise optical transmission path 22 through optical add/drop node (#1) 10 arrives optical add/drop node (#2) 10 via optical add/drop node (#4) 10 and optical add/drop node (#3) 10 after being amplified by the optical amplifier 32. Thus, the optical power of this signal becomes approximately "3" at the output port of optical add/drop node (#2) 10. In other words, the optical power of the first split signal and the optical power of the second split signal respectively added through optical add/drop node (#1) 10 are respectively "20" and "3" at the output port of optical add/drop node (#2) 10, and the total thereof is approximately "23".

In optical add/drop node (#2) 10, the optical power of the signal output from the transmitter 1 is attenuated by the variable optical attenuator 5 from "100" to "23". The amount of attenuation by the variable optical attenuator 5 is determined on the basis of the total of the optical power of a pair of signals, which are added to the optical transmission path 20 through optical add/drop node (#1) 10, at optical add/drop node (#2) 10. The attenuated signal is split by the variable split ratio optical coupler 2 at the ratio of "100:16". Accordingly, the optical power of the first split signal and the optical power of the second split signal are respectively approximately "20" and "3". Then, the first split signal is added to the counterclockwise optical transmission path 21. Accordingly, the optical power of the signal added to the counterclockwise optical transmission path 21 through optical add/drop node (#2) 10 is also "20" at the output port of optical add/drop node (#2) 10. In this configuration, the optical power of the signal transmitted through the counterclockwise optical transmission path 21 becomes approximately one-fourth while being transmitted from the output port of optical add/drop node (#2) 10 to the output port of optical add/drop node (#3) 10. Accordingly, both of the optical powers of the signals added to the counterclockwise optical transmission path 21 through optical add/drop node (#1 and #2) 10 are approximately "5" at the output port of optical add/drop node (#3) 10.

In optical add/drop node (#3) 10, the optical power of the signal output from the transmitter 1 is attenuated by the variable optical attenuator 5 from "100" to "17". Then, the attenuated signal is split by the variable split ratio optical coupler 2 at the ratio of "2:5". Accordingly, the optical power of the first split signal and the optical power of the second split signal are respectively approximately "5" and "12". Then, the first split signal is added to the counterclockwise optical transmission path 21. Accordingly, the optical power of the signal added to the counterclockwise optical transmission path 21 through optical add/drop node (#3) 10 is also "5" at the output port of optical add/drop node (#3) 10. In this configuration, the optical power of the signal transmitted through the counterclockwise optical transmission path 21 becomes approximately one-fourth while it is transmitted from the output port of optical add/drop node (#3) 10 to the output port of optical add/drop node (#4) 10. Accordingly, each optical power of any of the signals added to the counterclockwise optical transmission path 21 through optical add/drop nodes (#1, #2 and #3) 10 is approximately "1.25" at the output port of optical add/drop node (#3) 10.

In optical add/drop node (#4) 10, the optical power of the signal output from the transmitter 1 is attenuated by the variable optical attenuator 5 from "100" to "51". Then, the attenuated signal is split by the variable split ratio optical coupler 2 at the ratio of "1:40". Accordingly, the optical power of the first split signal and the optical power of the second split signal are respectively approximately "1.25" and "50". Then, the first split signal is added to the counterclockwise optical transmission path 21. Accordingly, the optical power of the signal added to the counterclockwise optical transmission path 21 through optical add/drop node (#4) 10 is also "1.25" at the output port of optical add/drop node (#3) 10. In other words, each optical power of any of the signals added to the counterclockwise optical transmission path 21 through the respective optical add/drop nodes (#1 through #4) 10 is "1.25".

As described above, in the optical network system 200, it is possible to make the optical power of each of the signals included in the WDM light equal to or approximately equal to one another by appropriately setting the attenuation amounts of the variable optical attenuators 5 and the split ratios of the variable split ratio optical couplers 2 in the respective optical add/drop nodes 10. Additionally, the same effect can be attained on the clockwise optical transmission path 22.

Figure 19A:
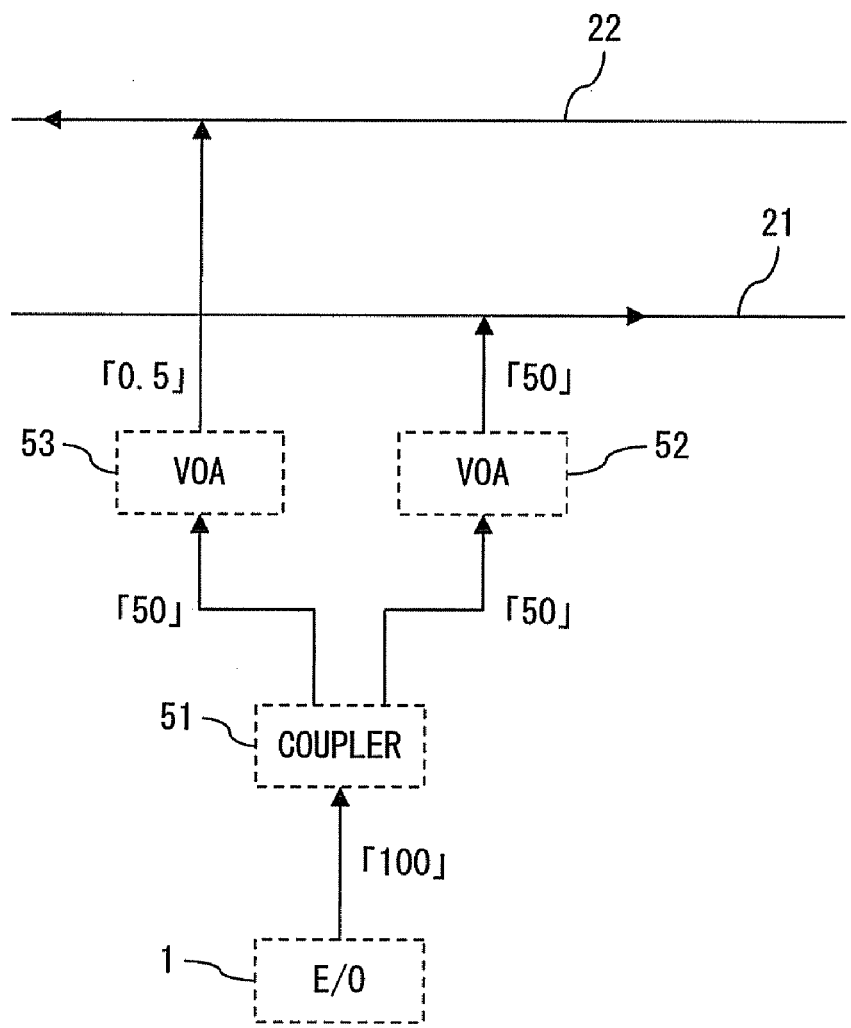
FIG. 19A shows properties of the conventional optical add/drop node.
Figure 19B:
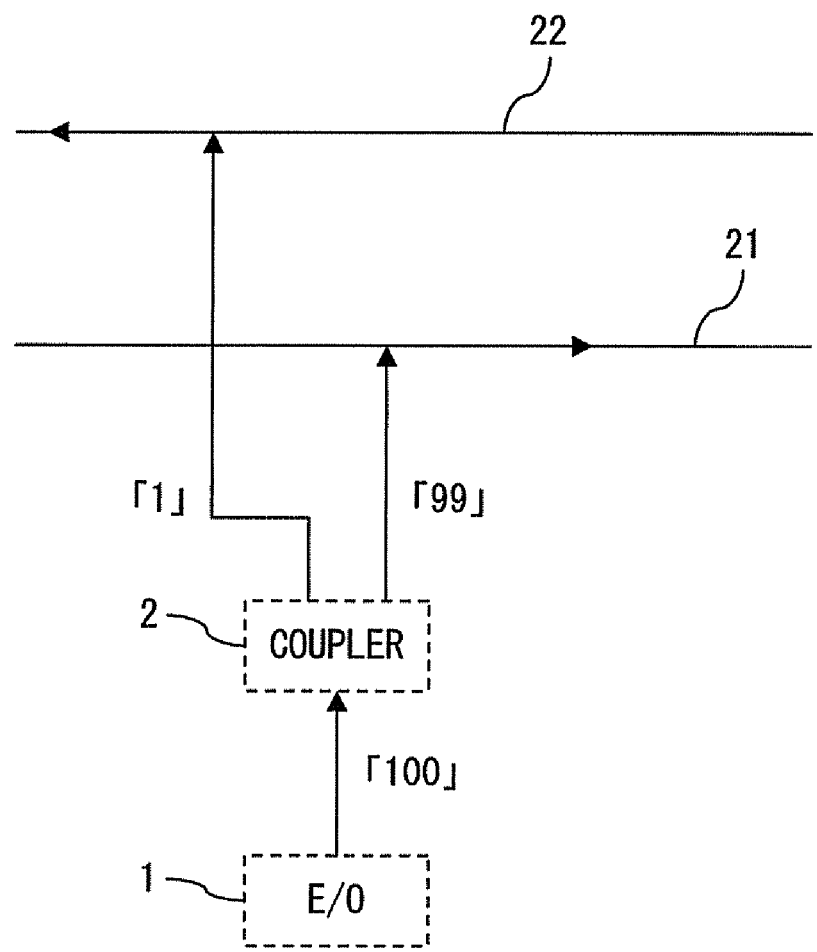
FIG. 19B shows properties of an optical add/drop node according to the present invention.

Effects of the present invention are explained by referring to FIGS. 19A and 19B. Here, the conventional technique assumed in FIG. 6 and optical add/drop nodes according to the embodiments of the present invention are compared. It is assumed that the difference in the optical power between a pair of signals respectively added to the counterclockwise optical transmission path 21 and the clockwise optical transmission path 22 is 20 dB. Also, the optical power output from the transmitter 1 is represented by "100".

In the optical add/drop node of the prior art, the optical signal output from the transmitter 1 is split by a bidirectional splitting coupler 51 at the ratio of 1:1, as shown in FIG. 19A. Accordingly, the optical power of the first split signal and the optical power of the second split signal obtained from the bidirectional splitting coupler 51 are each "50". Thereafter, the optical power of the first split signal and the optical power of the second split signal are adjusted by variable attenuators 52 and 53. In this configuration, in order to obtain the difference of 20 dB, the attenuation amounts of the variable attenuators 52 and 53 is set to "0 dB" and "20 dB", respectively. As a result of this, the optical power of the signal added to the counterclockwise optical transmission path 21 and the optical power of the signal added to the clockwise optical transmission path 22 are "50" and "0.5", respectively.

In contrast, in the optical add/drop nodes 10 according to the embodiments of the present invention, the optical signal output from the transmitters 1 is split by the variable split ratio optical coupler 2 at the ratio of "99:1", as shown in FIG. 19B. Accordingly, the optical power of the first split signal and the optical power of the second split signal obtained from the variable split ratio optical coupler 2 are respectively "99" and "1". Then, the first and second split signals are respectively added to the counterclockwise optical transmission path 21 and clockwise optical transmission path 22. In other words, when the optical add/drop node 10 according to the embodiments is utilized, the optical power of the signal that is to be added to the optical transmission path 20 can be approximately twice that of the configuration shown in FIG. 6. This means that the loss of approximately 3 dB can be avoided. Here, "3 dB" corresponds to the loss of the bidirectional splitting coupler 51 in FIG. 6.

As described above, by introducing the configurations in the present invention, it is possible to make the optical power of each of the signals included in WDM light greater while making the optical power levels of such signals equal to one another. Accordingly, the effects below can be attained.
(1) Transmission distance can be increased.
(2) The number of necessary WDM optical amplifiers can be reduced.
(3) The number of optical nodes that have to be provided on an optical network can be reduced.

Figure 20:
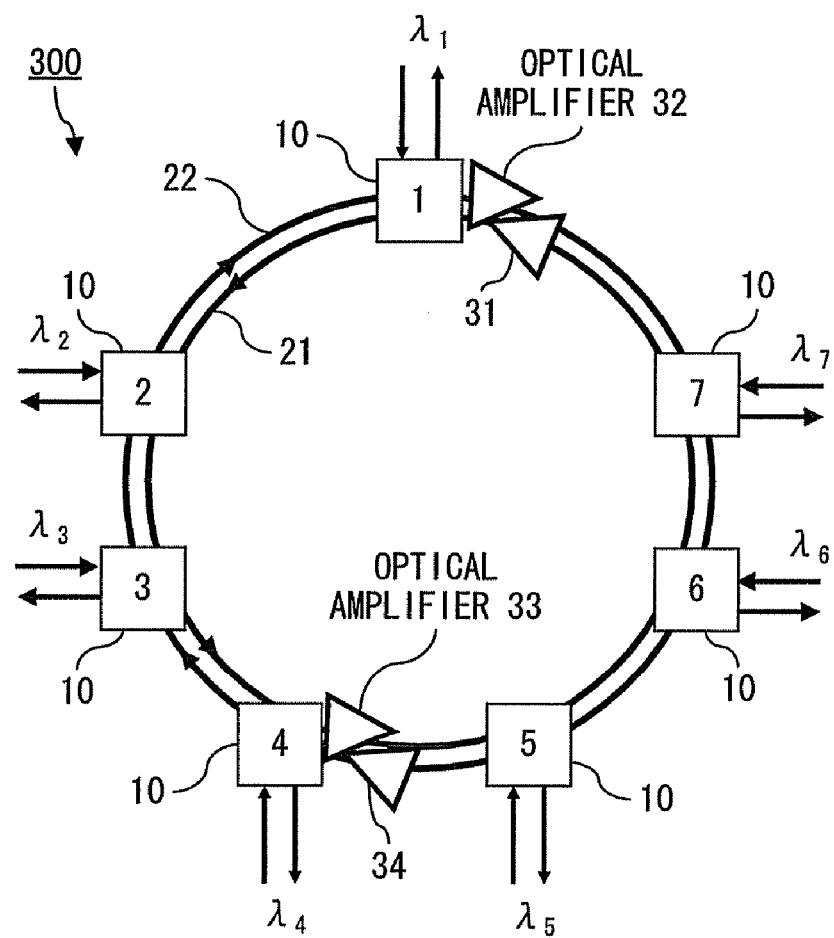
FIG. 20 shows a configuration of an optical network system according to still another embodiment of the present invention.

FIG. 20 shows a configuration of an optical network system according to still another embodiment of the present invention. An optical network system 300 comprises at least two optical amplifiers on each of the transmission paths. Specifically, the optical network system 300 comprises the optical add/drop nodes (#1 through #7) 10, the counterclockwise optical transmission path 21, the clockwise optical transmission path 22, the optical amplifiers 31 and 33 provided on the counterclockwise optical transmission path 21, and the optical amplifiers 32 and 34 provided on the clockwise optical transmission path 22.

FIG. 21 is a diagram showing the power levels of the optical signals in the optical network system shown in FIG. 20. It is assumed that the losses between the optical add/drop nodes (#1 through #7) 10 are respectively 2 dB (corresponding to approximately 10 km) in the configuration shown in FIG. 20. The optical amplifiers 31 and 32 are provided between optical add/drop node (#1) 10 and optical add/drop node (#7) 10, and adjacently to optical add/drop node (#1) 10. Similarly, the optical amplifiers 33 and 34 are provided between optical add/drop node (#4) 10 and optical add/drop node (#5) 10, and adjacently to optical add/drop node (#4) 10. The other conditions are the same as those shown in FIGS. 11 and 14. However, the gains of the optical amplifiers 31 through 34 are 24 dB each.

In the above case, the split ratios of the variable split ratio optical couplers 2 provided in the respective optical add/drop nodes (#1 through #7) 10 are as below.

Node #1 counterclockwise path:clockwise path=100:1 (the optical power on the counterclockwise optical transmission path is higher by 20 dB)

Node #2 counterclockwise path:clockwise path=100:16 (the optical power on the counterclockwise optical transmission path is higher by 8 dB)

Node #3 counterclockwise path:clockwise path=2:5 (the optical power on the counterclockwise optical transmission path is lower by 4 dB)

Node #4 counterclockwise path:clockwise path=1:40 (the optical power on the counterclockwise optical transmission path is lower by 16 dB)

Node #5 counterclockwise path:clockwise path=100:16 (the optical power on the counterclockwise optical transmission path is higher by 8 dB)

Node #6 counterclockwise path:clockwise path=2:5 (the optical power on the counterclockwise optical transmission path is lower by 4 dB)

Node #7 counterclockwise path:clockwise path=1:40 (the optical power on the counterclockwise optical transmission path is lower by 16 dB)

In addition, the attenuation amounts of the variable optical attenuators 5 in the respective optical add/drop nodes (#1 through #7) 10 are as below. However, optical add/drop node (#1) 10 does not have to be provided with the variable optical attenuator 5.

Node #1 0 dB
Nodes #2 and #5 5.4 dB
Nodes #3 and #6 6.6 dB
Nodes #4 and #7 1.9 dB It should be noted that although FIGS. 20 and 21 show the configuration in which two optical amplifiers are provided on the counterclockwise optical transmission path 21 and the clockwise optical transmission path 22, the present invention can also be applied to the case in which three or more optical amplifiers are provided on each optical transmission path.

Figure 22:
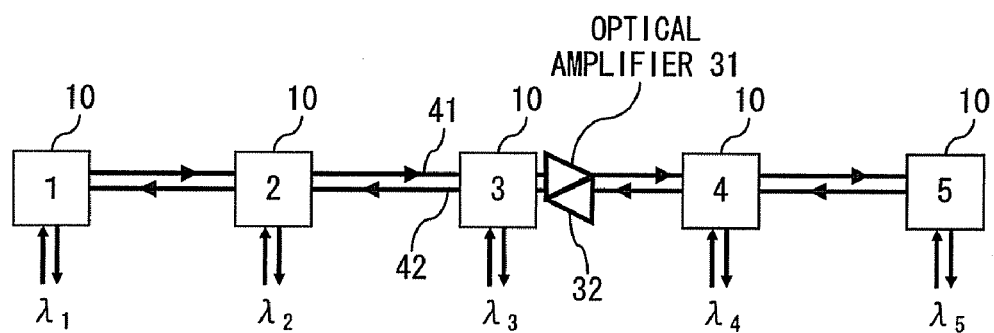
FIG. 22 shows a configuration of an optical network system in which optical nodes are connected in bus configuration.
Figure 26:
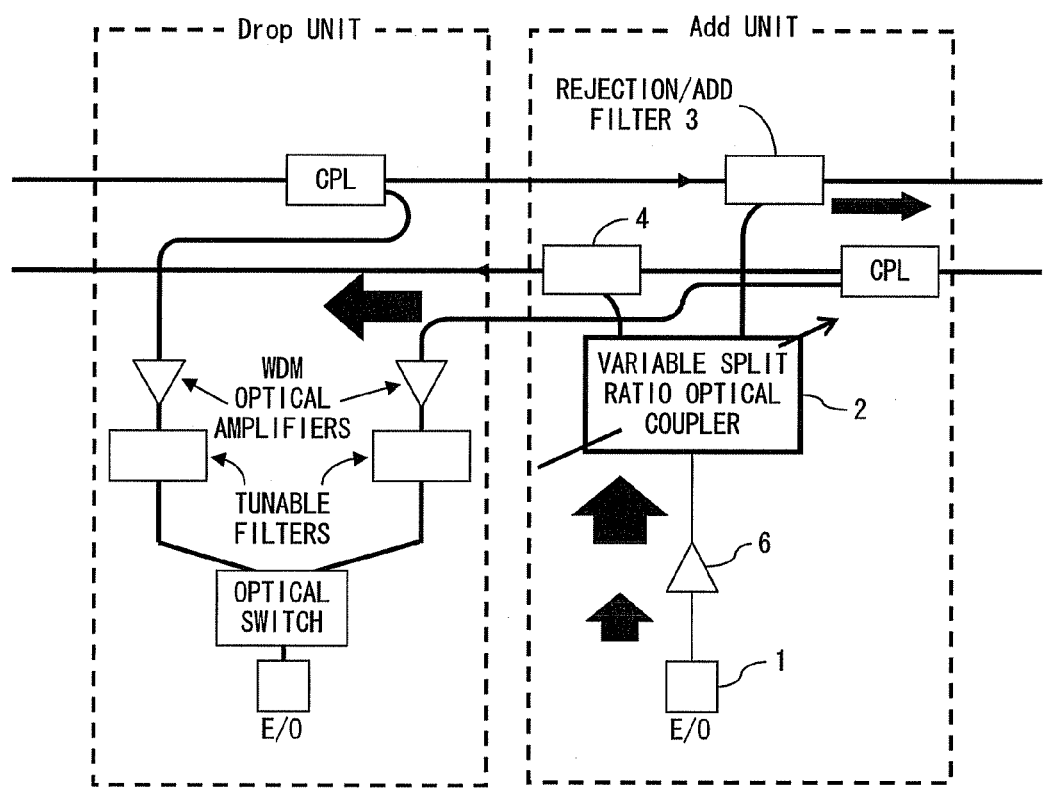
FIG. 26 shows the third configuration of an optical add/drop node.
Figure 27:
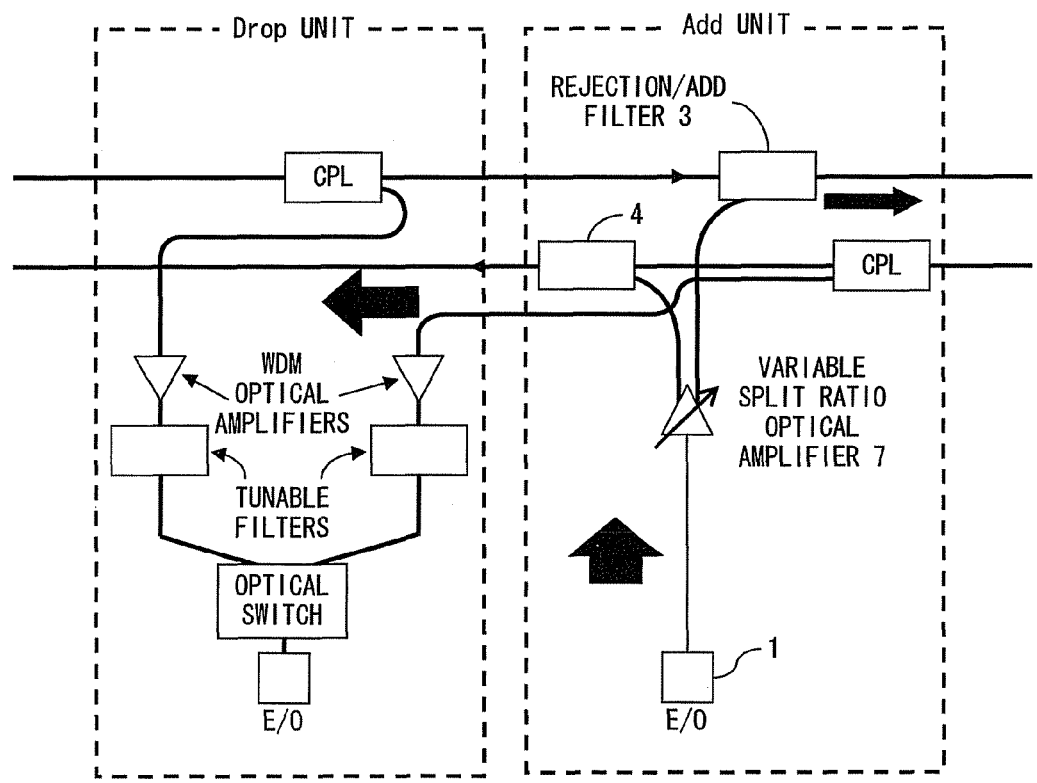
FIG. 27 shows the fourth configuration of an optical add/drop node.

Although the examples shown in FIGS. 7 and 13 and in FIG. 20 respectively employ the configurations of the optical networks in which a plurality of optical add/drop nodes are connected to form a ring, the present invention is not limited to these configurations. Specifically, the present invention can employ the configuration in which a plurality of optical add/drop nodes are connected in a bus configuration, as shown in FIG. 22 for example. An optical network system 400, shown in FIG. 22, comprises five optical add/drop nodes (#1 through #5) 10, optical transmission paths 41 and 42 that transmit optical signals in opposite directions to each other, and optical amplifiers 31 and 32.

FIG. 23 is a diagram showing the power levels of the optical signals in the optical network system shown in FIG. 22. It is assumed that the losses between optical add/drop nodes (#1 through #5) 10 are respectively 2 dB (corresponding to approximately 10 km) in the configuration shown in FIG. 22. The gains of the optical amplifiers 31 and 32 are respectively 16 dB. The other conditions are basically the same as those shown in FIGS. 11, 14, and 21. The optical power levels of the signals added to transmission path 41 through optical add/drop nodes (#1 through #4) 10 are respectively "R1", "R2", "R3", and "R4". The optical power levels of the signals added to transmission path 42 through optical add/drop nodes (#2 through #5) 10 are respectively "L2", "L3", "L4", and "L5".

In the above case, the split ratios of the variable split ratio optical couplers 2 provided in the respective optical add/drop nodes (#2 through #4) 10 are as below.

Node #2 transmission path 41: transmission path 42=1:1 (equal to each other between the transmission paths)
Node #3 transmission path 41 transmission path 42=6:100 (the power on transmission path 41 is lower by 12 dB)
Node #4 transmission path 41: transmission path 42=100:15 (the power on transmission path 41 is higher by 8 dB)

In addition, optical add/drop node (#1) 10 adds the signal having the optical power R1 only to the transmission path 41, and optical add/drop node (#5) 10 adds the signal having the optical power L5 only to the transmission path 42. Accordingly, optical add/drop nodes (#1 and #5) 10 do not have to be provided with the variable split ratio optical coupler 2. Additionally, the attenuation amounts of the variable optical attenuators 5 provided in optical add/drop nodes (#2, #3, and #4) 10 are respectively "1.6 dB", "0 dB", and "3.2 dB". However, optical add/drop nodes (#1, #3, and #5) 10 do not have to be provided with the variable optical attenuator 5.

As described above, by appropriately adjusting the split ratios of the variable split ratio optical couplers 2 provided in the respective optical add/drop nodes 10, it is possible to make the optical power of each of the signals added through the respective add/drop nodes 10 equal to one another, and to make the optical power of each of these signals greater. Further, even when network topologies are to be changed due to such as the addition of new optical add/drop nodes, the desired optical performance can be easily maintained only by changing the settings of the split ratios of the variable split ratio optical couplers 2 provided in the respective optical add/drop nodes.

Furthermore, in the above optical network systems, it is not necessary for all of the optical add/drop nodes to employ the configurations according to the present invention (i.e., the configurations shown in FIG. 8 and in FIGS. 15 through 17). For example, in a case in which the difference in the optical power between the first and second split signals is small and the optical power of each of the split signals has a margin that is equal to or greater than 3 dB with respect to the assumed value, the optical add/drop nodes can employ the configuration shown in FIG. 6. In the above examples, optical add/drop nodes (#2 and #3) 10 shown in FIG. 13, and optical add/drop nodes (#2, #3, #5, and #6) 10 shown in FIG. 20 can employ the configuration shown in FIG. 6. In other words, in the optical network systems according to the present invention, the optical add/drop nodes of the present invention (the configurations shown in FIG. 8 and FIGS. 15 through 17) and the optical add/drop nodes of the prior are may be used together.

FIGS. 24 through 30 respectively show configurations of the optical add/drop nodes, in the embodiments of the present invention, including a drop unit for obtaining optical signal from a transmission path. The add units shown in FIGS. 24 through 27 respectively employ the same configurations as those shown in FIG. 8 and FIGS. 15 through 17; accordingly, the explanations thereof are omitted.

Each of the drop units shown in FIGS. 24 through 27 comprise a pair of splitting couplers (CPL) for respectively splitting WDM light transmitted through a pair of optical transmission paths, a pair of WDM optical amplifiers for respectively amplifying the WDM light split by the pair of splitting couplers, a pair of tunable filters for respectively selecting optical signals with prescribed wavelengths from the amplified WDM light, an optical switch for selecting one of the signals from the pair of tunable filters, and a transmitter (E/O) for transmitting the optical signal selected by the optical switch to a communication device (not shown) such as, for example, gateway devices, routers, terminals or the like.

Figure 28:
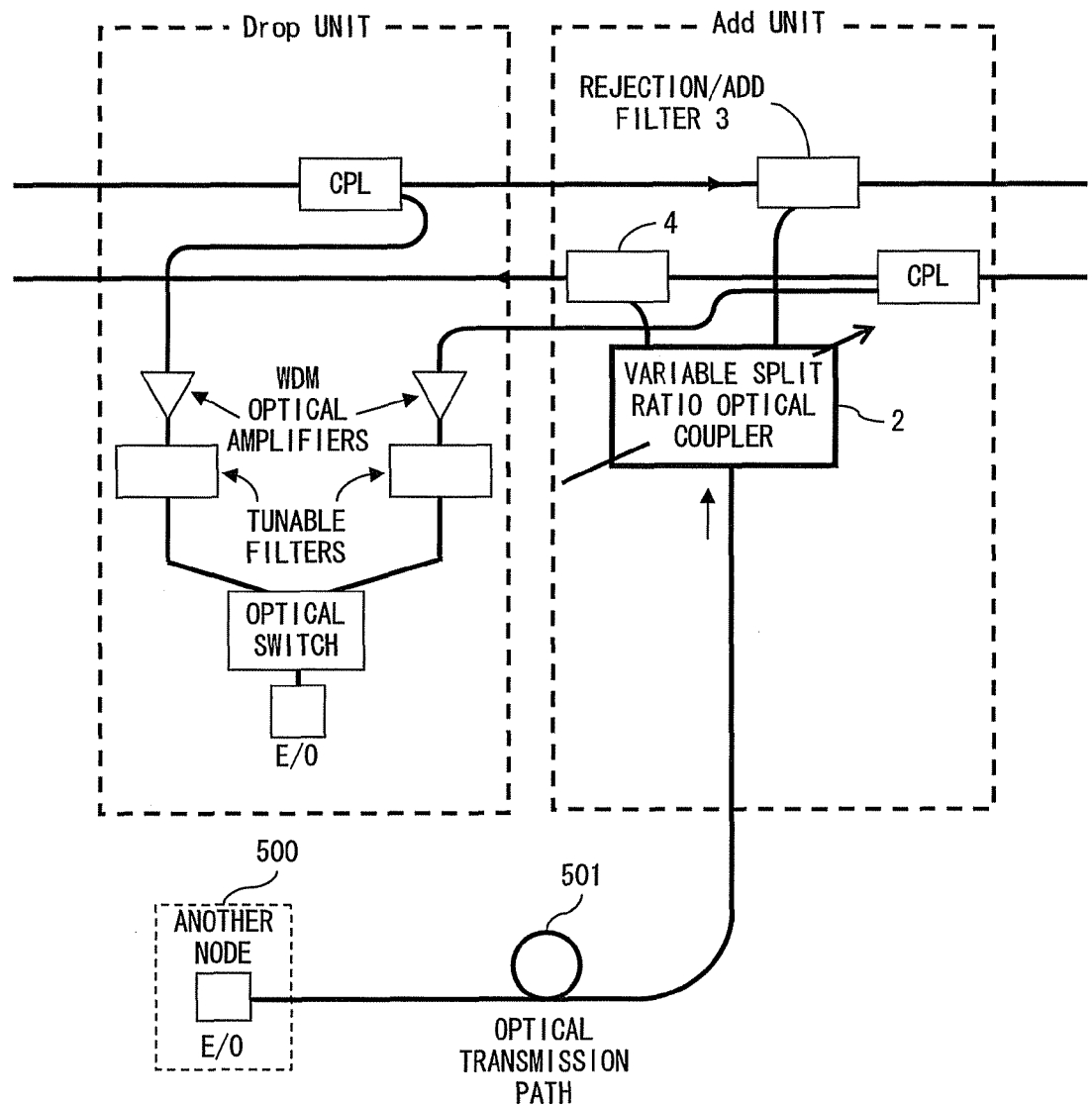
FIG. 28 shows the fifth configuration of an optical add/drop node.
Figure 29:
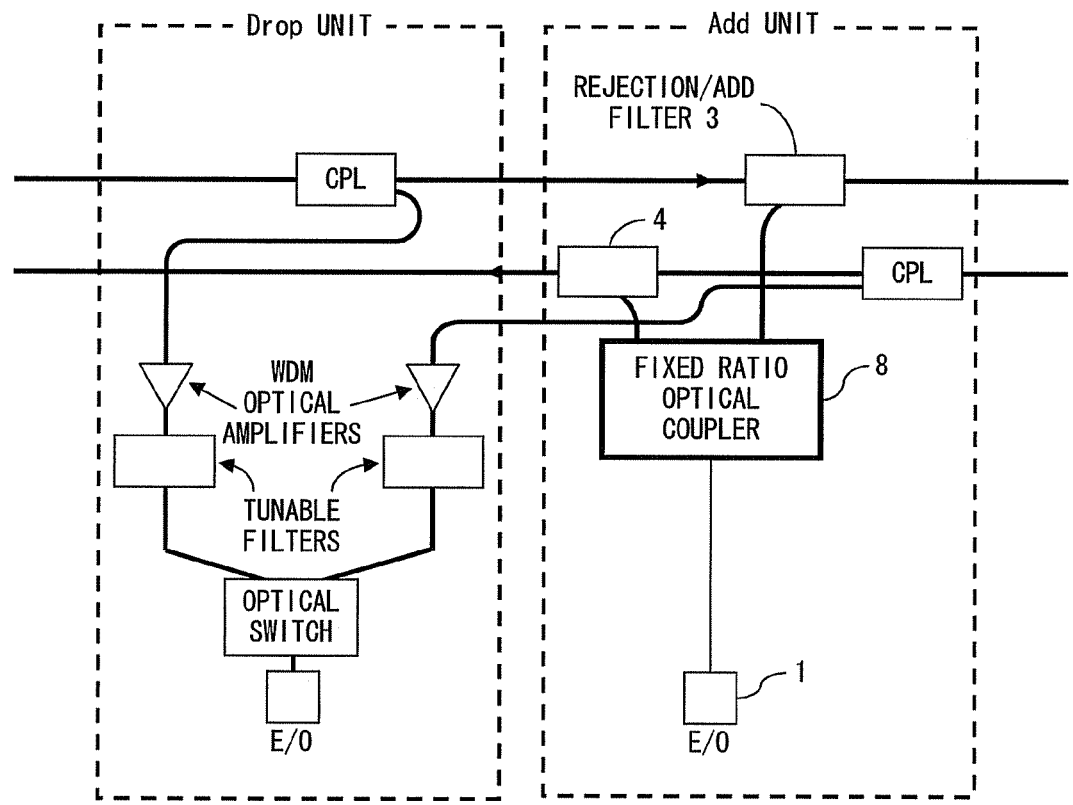
FIG. 29 shows the sixth configuration of an optical add/drop node.

One of the specific configurations for directly adding an optical signal from another node 500 to the optical network is shown in FIG. 28. One of the specific examples of the configurations in which a variable split ratio coupler is not used and a fixed ratio optical coupler that splits an optical signal at a required split ratio is used is shown in FIG. 29.

Figure 30:
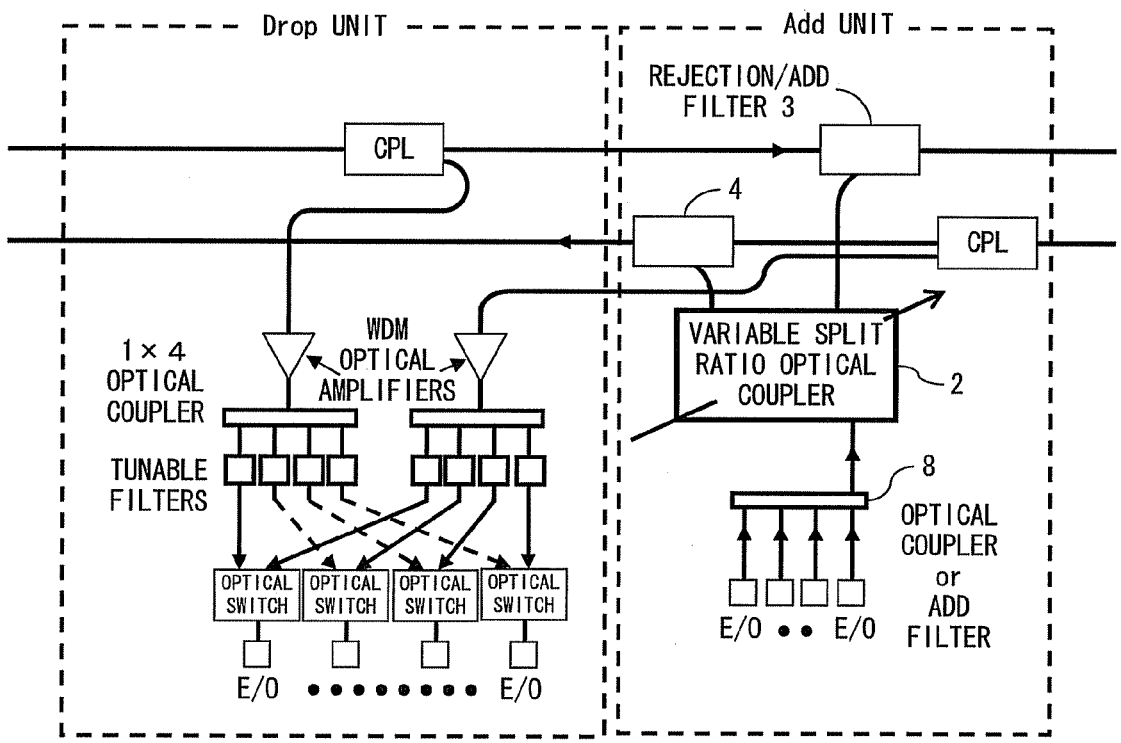
FIG. 30 shows the seventh configuration of an optical add/drop node.

FIG. 30 shows a configuration of an optical add/drop node with four-wavelength inputs and four-wavelength outputs. The add unit of this optical add/drop node comprises four transmitters 1 for generating signals with different wavelengths and a WDM optical coupler (or an add filter) 8 for coupling the signals from the four transmitters 1. Then, the coupled optical signal is added to the respective optical transmission paths after being split by the variable split ratio optical coupler 2. The drop unit of this optical add/drop node comprises four tunable filters with different passing wavelengths, and extracts signals at four wavelengths by using these filters.

What is claimed is:

1. An optical add/drop device used in an optical network having a first optical transmission path and a second optical transmission path for transmitting signals in the opposite directions to each other, a plurality of the optical add/drop devices being connected to each other by the first optical transmission path and the second optical transmission path, the optical add/drop device comprising:
   an optical splitter to split an input optical signal to generate a first split signal and a second split signal;
   an optical add unit to add the first split signal to the first optical transmission path and to add the second split signal to the second optical transmission path;
   at least one amplifier in the first optical transmission path or the second optical transmission path;
   an optical transmitter to generate the input optical signal; and
   an adjustment unit, provided between said optical transmitter and said optical splitter, to adjust the optical power of the optical signal output from said optical transmitter,
wherein
   the adjustment unit adjusts the optical power of the optical signal and said optical splitter splits the input optical signal at a split ratio such that the optical power of a signal added to the first optical transmission path through another optical add/drop device and the amplifier or through another optical add/drop device and the optical power of the first split signal are equal to or approximately equal to each other on the first optical transmission path, and such that the optical power of a signal added to the second optical transmission path through another optical add/drop device and the amplifier or through another optical add/drop device and the optical power of the second split signal are equal to or approximately equal to each other on the second optical transmission path.

2. The optical add/drop device according to claim 1, wherein:
   said optical splitter is a variable split ratio optical coupler.

3. An optical network system having a plurality of optical add/drop devices, and a first optical transmission path and a second optical transmission path that are for connecting the plurality of optical add/drop devices and that transmit signals in opposite directions to each other, wherein:
   at least one of the plurality of optical add/drop devices is the optical add/drop device described in claim 1.

4. The optical network system according to claim 3, wherein:
   a first optical amplifier and a second optical amplifier are provided, adjacently to each other, on the first optical transmission path and the second optical transmission path, respectively.

5. The optical network system according to claim 4, wherein:
   the optical power of a signal transmitted on the first optical transmission path and the optical power of a signal transmitted on the second optical transmission path are equal to or approximately equal to each other at an input port of the first optical amplifier and an input port of the second optical amplifier.

6. The optical network system according to claim 3, wherein:
   at least one of the plurality of optical add/drop devices includes
   a transmitter to generate an optical signal;
   an optical splitter to split the optical signal at a ratio of "1:1";
   a pair of attenuators to respectively adjust the output power of the optical splitter; and
   an optical device to add the outputs of the pair of attenuators respectively to the first optical transmission path and the second optical transmission path.

7. The optical network system according to claim 3, wherein:
   the first optical transmission path and the second optical transmission path constitute a ring network.

8. The optical network system according to claim 3, wherein:
   the first optical transmission path and the second optical transmission path constitute a bus network.

9. An optical add/drop device used in an optical network having a first optical transmission path and a second optical transmission path for transmitting signals in the opposite directions to each other, the optical add/drop device comprising:
   an adjustment unit to adjust the optical power of an input optical signal;
   an optical splitter to split a signal with optical power adjusted by said adjustment unit to generate a first split signal and a second split signal;
   an optical add unit to add the first split signal to the first optical transmission path and to add the second split signal to the second optical transmission path; and
   at least one amplifier in the first optical transmission path or the second optical transmission path, wherein
   the amount of optical power adjusted by said adjustment unit and the split ratio of said optical splitter are determined such that the optical power of each signal added through said optical add unit is equal to or approximately equal to the optical power of a signal added through at least one of another optical add/drop device and the at least one amplifier respectively on the first optical transmission path and the second optical transmission path.

10. The optical add/drop device according to claim 9, wherein:
   said adjustment unit adjusts the optical power of the input optical signal such that the optical power of a signal guided to said optical splitter is equal to or approximately equal to the total power of a pair of optical signals, added by another optical add/drop device and transmitted respectively via the first and second transmission paths, at said optical add/drop device; and
   said optical splitter splits the input optical signal at a split ratio such that optical power of a signal added to the first optical transmission path through another optical add/drop device and the optical power of the first split signal are equal to or approximately equal to each other on the first optical transmission path, and such that the optical power of a signal added to the second optical transmission path through another optical add/drop device and the optical power of the second split signal are equal to or approximately equal to each other on the second optical transmission path.

11. The optical add/drop device according to claim 9, wherein:
   said adjustment unit is a variable optical attenuator.

12. The optical add/drop device according to claim 9, wherein:
said adjustment unit is an optical amplifier.

13. An optical add device used in an optical network having a first optical transmission path and a second optical transmission path for transmitting signals in opposite directions to each other, the optical add device comprising:
an optical splitter to split an input optical signal to generate a first split signal and a second split signal;
an optical add unit to add the first split signal to the first optical transmission path and to add the second split signal to the second optical transmission path;
an optical transmitter to generate the input optical signal; and
an adjustment unit, provided between said optical transmitter and said optical splitter, to adjust the optical power of the optical signal output from said optical transmitter,
wherein:
the adjustment unit adjusts the optical power of the optical signal and said optical splitter splits the input optical signal at a split ratio such that the optical power of a signal added to the first optical transmission path through another optical add device and an amplifier and the optical power of the first split signal are equal to or approximately equal to each other on the first optical transmission path, and such that the optical power of a signal added to the second optical transmission path through another optical add device and the optical power of the second split signal are equal to or approximately equal to each other on the second optical transmission path.

14. An optical add device used in an optical network having a first optical transmission path and a second optical transmission path for transmitting signals in opposite directions to each other, the optical add device comprising:
an adjustment unit to adjust the optical power of an input optical signal to an optical splitter;
the optical splitter to split a signal with its optical power adjusted by the adjustment unit, and to generate a first split signal and a second split signal; and
an optical add unit to add the first split signal to the first optical transmission path and to add the second split signal to the second optical transmission path, wherein:
the amount of optical power adjusted by said adjustment unit and the split ratio of said optical splitter are determined such that the optical power of each of the signals added through said optical add unit is equal to or approximately equal to the optical power of a signal added through at least one of another optical add device and the amplifier respectively on the first optical transmission path and the second optical transmission path.

* * * * *